US009423092B1

(12) United States Patent
Deyaf et al.

(10) Patent No.: US 9,423,092 B1
(45) Date of Patent: Aug. 23, 2016

(54) METHOD AND APPARATUS FOR LIGHT ILLUMINATION WITH LIGHT SPREAD DIFFUSION IN A VEHICLE LIGHT

(71) Applicant: Feniex Industries Inc., Austin, TX (US)

(72) Inventors: Hamza Deyaf, Austin, TX (US); Nicholas Mazzanti, Austin, TX (US); Alaa Hassan, Austin, TX (US); Levi Propst, Austin, TX (US)

(73) Assignee: Feniex Industries, Inc., Austin, TX (US)

( * ) Notice: Subject to any disclaimer, the term of this patent is extended or adjusted under 35 U.S.C. 154(b) by 0 days.

(21) Appl. No.: 15/054,115

(22) Filed: Feb. 25, 2016

Related U.S. Application Data

(63) Continuation of application No. 14/752,823, filed on Jun. 26, 2015.

(51) Int. Cl.
  *F21S 8/10* (2006.01)

(52) U.S. Cl.
  CPC .................................. *F21S 48/1757* (2013.01)

(58) Field of Classification Search
  CPC . F21S 48/1757; F21S 48/115; F21S 48/1225; F21S 48/1329
  USPC ............ 362/311.02, 332, 277, 520, 521, 522, 362/512, 513, 543, 544, 545
  See application file for complete search history.

(56) References Cited

U.S. PATENT DOCUMENTS

| | | | |
|---|---|---|---|
| 2010/0284192 A1* | 11/2010 | Chen .......................... | F21K 9/00 362/311.02 |
| 2013/0170220 A1* | 7/2013 | Bueeler ...................... | F21K 9/00 362/296.01 |
| 2014/0313744 A1* | 10/2014 | Collias ....................... | F21K 9/50 362/311.02 |
| 2014/0334159 A1* | 11/2014 | Ferguson ................... | F21V 5/04 362/311.02 |
| 2015/0073227 A1* | 3/2015 | Teder ......................... | A61B 1/06 600/249 |

* cited by examiner

*Primary Examiner* — Laura Tso

(57) ABSTRACT

A lighting fixture for vehicles is described herein. The light fixture is configured to produce a variable light output with variable angle of light spread. A light source, such as a series of connected light emitting diodes, encapsulated by optics, are affixed to a light fixture. A series of optics facing the light source may thus be manipulated and moved in a linear fashion towards or away from a light source in order to achieve a particular angle of light spread. The optics are controlled by a controller coupled to the light fixture and may function in an automated method or may respond to manual control. An adjustability mechanism assembly existing within and coupled to the light fixture operates the series of optics in a linear fashion towards or away from a light source. The light fixtures produce a range of light spreads from a focused spot light to a wider flood light.

19 Claims, 14 Drawing Sheets

METHOD AND APPARATUS FOR LIGHT ILLUMINATION WITH LIGHT SPREAD DIFFUSION IN A VEHICLE LIGHT

BACKGROUND OF THE INVENTION

1. Field of the Invention

The illustrative embodiments relate generally to an improved system for illumination for vehicles, and more particularly, to a method and apparatus for adjusting the angle of spread of light from a narrow angle spot light to a wide angle flood light embedded into a single lighting system for vehicles, especially vehicles designed for purposes of unsteady and uneven terrain, such as, without limitation, off-road vehicles and sport utility vehicles.

2. Background Art

In any off-road vehicle, the characteristics of illumination as produced by the lighting systems assembled with the vehicle are of critical importance to the driver. In off-road vehicles, lighting systems are frequently utilized in nighttime driving, and frequently travel over rough and uneven terrain or surfaces.

In the off-road vehicle industry, a light stick is the term commonly used for an enclosed lighting unit, which is frequently combined with a light source such as a set of light emitting diodes (hereinafter referred to as LED or LEDs). Such LED lights are oftentimes enclosed in a single housing unit, whereby the lighting unit may be programmed to provide additional lighting for aiding a driver and may be mounted or fixed to the vehicle.

Typically, the angle of spread is fixed for a single light stick, meaning that the light produced by the set of LEDs is emitted at a defined, non-variable angle of spread. Angle of spread refers to the beam angle that a beam of light as produced by the LED in conjunction with an optic or reflector can be measured or described. When measured, the beam angle is measured in degrees. A range of terms is also used to characterize or describe the light beam angle ranging from very narrow spot light to wide flood light.

A method to calculate the beam angle and more technical definition states that the beam angle is the angle between those points on opposite side of the light beam axis where the intensity of the light emitted drops to 50% of the maximum. The measurement is determined in terms of degrees. LED lighting like most lights come with a variety of descriptions for the size of the area illuminated by the light bulb. Examples include LED flood light, LED spot light, narrow beam LED light, and wide beam LED strip lights. Each is a way of stating LED beam angle. Typically a narrow beam angle is a 'spot' of light and a broader beam angle 'floods' an area with light, called a flood light. LED beam angles are not used consistently by light bulb manufacturers. Generally used terms for the angle of spread of light beams include, very narrow spot, narrow spot, spot, narrow flood, flood, wide flood, and very wide flood. Thus, the angle of spread of light emanating from a light source has a variety of angles at which the light beam may be set to function.

The different beam angles of spread serve different purposes. Light beams projected at narrow angle can function to illuminate at a further distance for an off road vehicle. In contrast to the narrow spot light, when a wide flood beam is utilized, the user seeks to illuminate a wider general area.

A significant limitation to the type of light beam available to a user is that presently available apparatuses only provide the ability to implement a fixed set of light spreads that is emitted from an auxiliary vehicle LED light stick or light bar. In other words, the light spread emitted is either a fixed set of narrow light beam or a wide light beam or combination. It would be desirable to provide the ability to have an adjustable light spread, so that the user may select the necessary light spread according to the surroundings and the optimal type of lighting required on the same auxiliary vehicle LED system.

Many of the currently available processes for installing auxiliary vehicle LED lights to a vehicle is often a labor intensive, expensive, time-consuming, and arduous process that may result in permanent modifications and alterations to the appearance and operating system of a motor vehicle. Thus, it is desirable that illumination options be maximized to reduce the labor and cost associated with such installation.

BRIEF SUMMARY OF THE INVENTION

The presently disclosed subject matter was devised in view of these and other problems and features in association with the conventional art. An illustrative embodiment provides a lighting unit with an adjustable light component, whereby the light beams emitted from the lighting unit may be modified to suit the needs of the user. In the illustrative embodiment, the light beams emitted from a same lighting unit may be adjusted within a set range in order to produce a beam of light as narrow or wide as needed to suit the needs of the user. In one embodiment, the light source is intended for use as vehicle auxiliary lights, whereby the light source is attached either on the exterior or interior structure of a vehicle, or both.

BRIEF DESCRIPTION OF THE SEVERAL VIEWS OF THE DRAWINGS

The novel features believed characteristic of the invention are set forth in the appended claims. The illustrative embodiments, as well as a preferred mode of use, further objectives and advantages thereof, will best be understood by reference to the following detailed description when read in conjunction with the accompanying drawings, wherein:

DETAILED DESCRIPTION OF THE INVENTION

Frequently, it is desirable or necessary to attach one or more auxiliary light devices to a vehicle. This may be necessary for various emergency vehicles, such as police cars, fire trucks, as well as public utility vehicles. Additionally, off road vehicles are often retroactively fitted with auxiliary light devices that provide additional lighting for a variety of purposes.

The different illustrative embodiments recognize and take into account that regarding illumination, it would be desirable to provide the ability to adjust a light spread emitted from an auxiliary LED lighting unit. Specifically, the ability to provide the user with a range of light spreads emitted as either a narrow spot light or a wide flood light. The prior art has been deficient in producing any such lighting units, particularly for use with vehicles. Additionally, vehicles have a harsh working environment with many moving parts and components, and any auxiliary light fixtures must be able to operate in conjunction with varying weather conditions, including extreme hot or cold temperatures, rain, snow, hail, and other such conditions. The prior art does not describe any effective method for incorporating in an individual unit a light fixture, operable with a vehicle's existing power source and systems, whereby the light fixture produces an output of light with variable, adjustable angles of light spread to suit the needs of a driver of this vehicle.

Referring now to FIG. 1A-FIG. 1L, a pictorial illustration of various configurations for producing a light spread with varying angles is provided. It is understood that these embodiments are not limited to those shown in FIG. 1A-FIG. 1L, which may be examples of the method and apparatus discussed herein. FIG. 1A-FIG. 1L provides a few of the envisioned components for achieving the varying angle of light spread desired by a driver of a vehicle with a light fixture in accordance with the illustrated embodiments.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. Any feature that is described in connection to any one embodiment may also be applicable to any other embodiment. It is also understood that other embodiments may be utilized and that logical structural, mechanical, electrical and chemical changes may be made without departing from the spirit or scope of the invention.

Figure 1A:
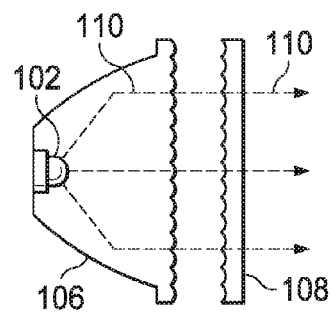
FIG. 1A, FIG. 1B, and FIG. 1C are illustrations of a total internal reflection optic with a diffuser coupled with another optic in accordance with an illustrative embodiment.
Figure 1B:
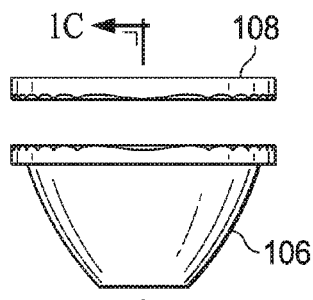
Figure 1C:
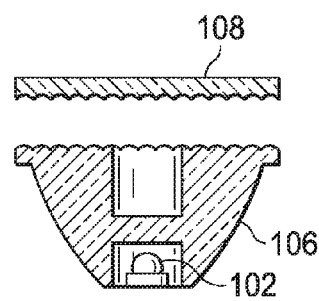

FIG. 1A, FIG. 1B, and FIG. 1C are provided along with the present disclosure. FIG. 1A portrays a side view of an optic in accordance with an illustrative embodiment. FIG. 1B portrays a front view of an optic assembly whereby the top and the base of the optic are within view. FIG. 1C depicts an interior cross-section of the optic that is displayed in FIG. 1A and FIG. 1B. Thus, the optic assembly displayed in FIG. 1B is also displayed in FIG. 1B and FIG. 1C.

As seen in FIG. 1A, a light source 102 is affixed to optic 106. The light output 110 is reflected off of the sides of optic 106 and directed in a forward direction through a first optic 106. The light output 110 produced by the light source 102 continues to transmit through the second optic 108. In a preferred embodiment, first optic 106 and second optic 108 both include a diffuser on one of the surfaces of the first optic 106 and second optic 108. As seen in FIG. 1A, first optic 106 and second optic 108 appear to have a textured surface to represent the diffusers.

The diffuser is essentially a textured surface located on these optics which functions to disseminate the light output from the light source in a more uniform manner. Oftentimes, such diffusers for optics, such as first optic 106 and second optic 108 are known as "flutes" and the optics are described to be "fluted". The flutes may appear as either vertical lines or horizontal lines on the surface of the optic lenses. In FIG. 1A, FIG. 1B, and FIG. 1C, these flutes are illustrated as the set of curved lines on the surfaces of the optics, optic 106 and optic 108.

By including optic 106, a greater amount of light from light output 110 is actually reflected off of the internal surfaces of the optic, thus increasing the light output efficiency. Optic 106 is an example of a Total Internal Reflection (TIR) optic. Oftentimes, such optic may be parabolic shaped, however, there are other shapes that may be used as well for achieving Total Internal Reflection.

Total Internal Reflection optic can be described to catch the light output emitted from a light source, such as light output 110, and redirect the light output in a forward direction through another surface to more effectively distribute the light output in the direction that one would typically want the light output to be distributed. Instead of allowing the light output to "fan out" along the outside edges, the light output, such as light output 110, is naturally directed to the sides of optic 106, and at a critical angle where a portion of light output 110 meets with the sides of optic 106, this portion of light output is projected in a forward direction. As a result, light output 110 is more focused and uniformly distributed. A Total Internal Reflection optic (TIR) may also be described herein as an internal reflecting optic or an internal reflection optic.

Additionally, first optic 106 and 108 have fluted surfaces. These fluted surfaces operate to more effectively distribute the light output in either a horizontal or vertical direction, depending on the direction of the flutes. In accordance with an illustrative embodiment, the positioning of second optic 108 may be moved linearly closer to or farther from first optic 106, which would result in a change in the light spread of the light output provided by the light source. The illustrated methods and apparatuses described herein provided for a system for manipulating the position of the second optic with respect to the first optic, either automatically or manually to assist the driver with lighting capabilities not previously available in auxiliary vehicle lighting.

FIG. 1A provides a front view and FIG. 1C provides a cross-section perspective of a light assembly as seen in FIG. 1A. LED 102 is contained within an optic, such as optic 106. In a preferred embodiment, optic 106 is a fluted TIR optic with a fluted optic 106. Additionally, in a preferred embodiment, optic 108 is a fluted lens. In accordance with a method as described herein, by manipulating the position of fluted lens 108 with respect to fluted TIR optic 106 the light beams emitted by LED 102 may be made to vary in angle of spread. Thus, the same light assembly is configured to produce a range of very narrow to very wide light beam.

Figure 1D:
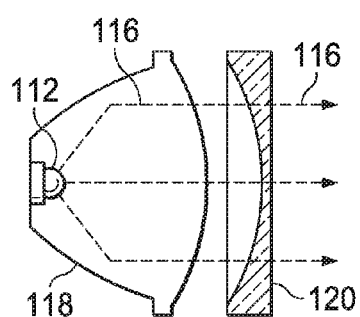
FIG. 1D, FIG. 1E, and FIG. 1F are illustrations of a configuration of another total internal reflection optic coupled with another optic in accordance with an illustrative embodiment.
Figure 1E:
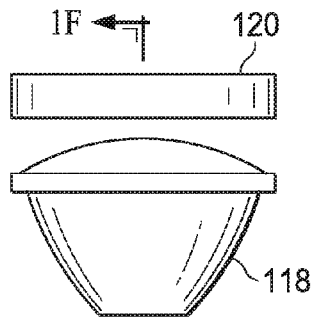
Figure 1F:
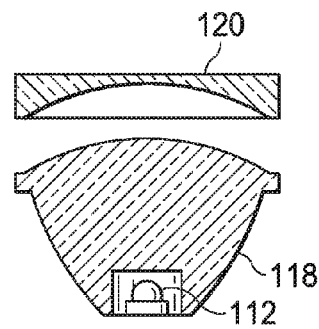

FIG. 1D, FIG. 1E, and FIG. 1F illustrate another embodiment using a secondary method, whereby two optics are also utilized. FIG. 1D is meant to portray an image of one side of an optic in accordance with an illustrative embodiment. FIG. 1E is meant to portray a view of an optic assembly from a frontal perspective whereby the top and the base of the optic are visible. FIG. 1F is meant to depict an interior cross-section of the optic assembly that is displayed in FIG. 1D and FIG. 1E. Thus, the optic assembly in FIG. 1D is also displayed in FIG. 1E and FIG. 1F.

Second optic 120 may be manually or automatically moved in a linear direction closer to or farther from first optic 118. The light output 116, when exiting from the light source 112 connects with the internal sides of the TIR optic 118 and is directed outwardly and in a forward direction through first optic 118. As illustrated in FIG. 1D, first optic 118 and second optic 120 are not fluted or textured surfaces. In accordance with an illustrative embodiment, first optic 118 represents a TIR convex optic while second optic 120 represents a planoconcave surface.

FIG. 1E and FIG. 1F provide for an illustrative embodiment of a front view as well as a cross-sectional view of an exemplary combination of optic 118 and optic 120 in accordance with the apparatus and method described for FIGS. 1D, 1E, and 1F. These illustrations are meant for exemplary purposes, and not meant to limit the scope or addition of other components that may be combined with such a unit. As seen in FIG. 1D, in a preferred embodiment, optic 120 may be a plano-concave lens. A plano-concave lens has at least one concave surface, and is a type of optical lens. A plano concave lens is oriented with the plano or flat side of the lens towards the desired focal plane. As seen in FIG. 1D and FIG. 1F, the plano side of the plano concave lens is facing outwards for allowing light beams 116 to project to any area located in front of the lens, and the concave portion of the lens is facing towards optic 118. A concave shape refers to a lens with an inward curve, whereby the lens portion is rounded in an inwards direction. A convex shape refers to an outwardly directed curve, thus the terms concave and convex are opposite for describing the shape of the lenses with respect to one another. In a preferred embodiment for FIGS. 1D, 1E, and 1F, the light assembly combination of optic 118, may be a convex TIR optic. Light source 112 is depicted as an LED, which provides the light beams for manipulation by positioning optic 120 with respect to optic 118.

Figure 2A:
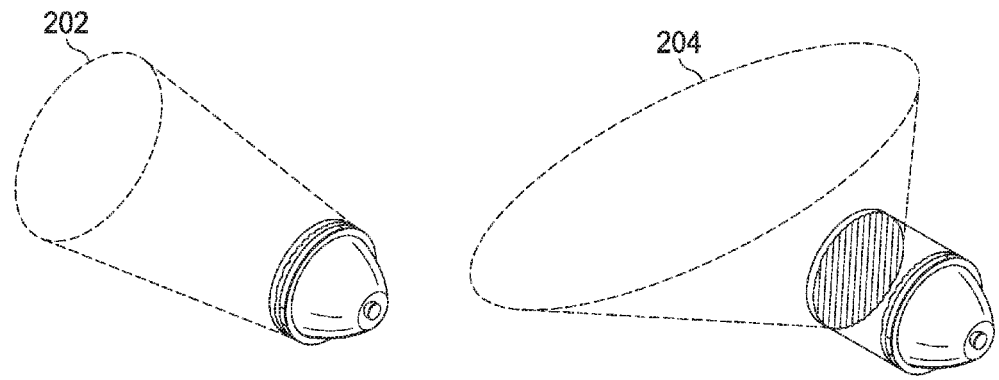
FIG. 2A is an illustration of light output and light spread in accordance with illustrative embodiments.
Figure 2B:
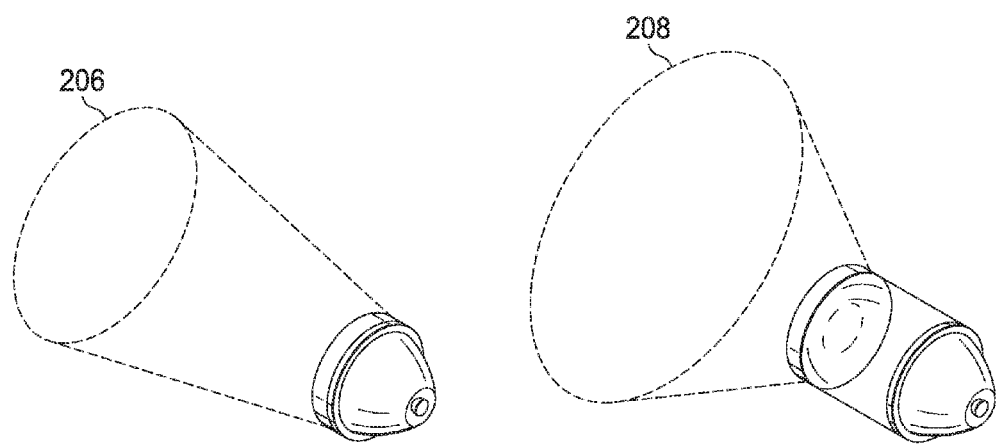
FIG. 2B is an illustration of light output and light spread in accordance with illustrative embodiments.
Figure 2C:
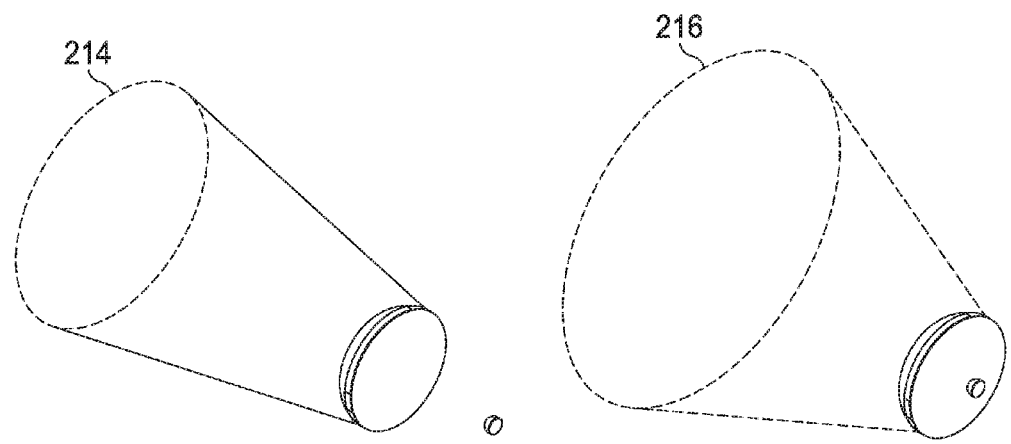
FIG. 2C is an illustration of light output and light spread in accordance with illustrative embodiments.
Figure 2D:
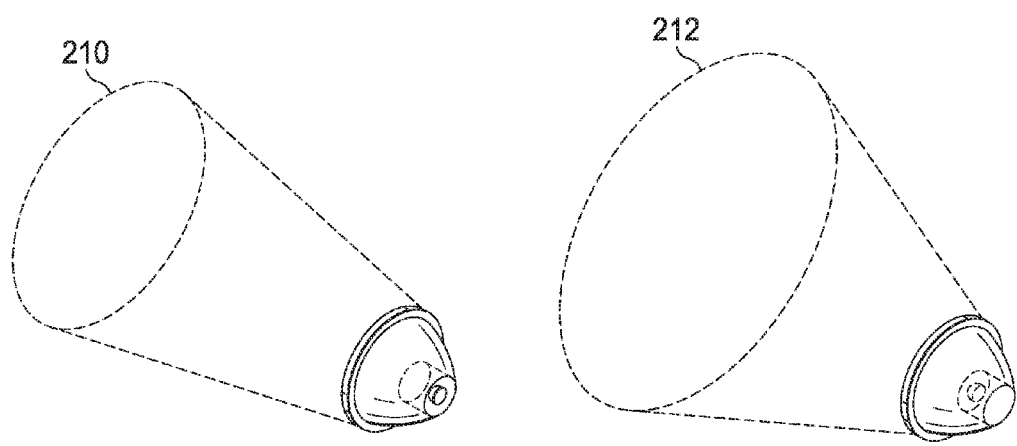
FIG. 2D is an illustration of light output and light spread in accordance with illustrative embodiments

The methods differ in FIG. 2A and FIG. 2B in that by providing a fluted surface for a first and second optic, in addition to altering the angle of the light spread emitted, the overall dimensions of the light spread may be altered as well when utilizing the method provided in FIG. 2A. Therefore, the output of the shape of light need not be limited to a circular design.

This can be further seen in FIG. 2A, FIG. 2B, FIG. 2C, and FIG. 2D. Light spread 204 is pictured in FIG. 2A as being elliptically shaped in contrast to light spread 208 in FIG. 2B, which is conical or cone like in shape. 208 may also be described as being more circular in shape than the elliptical effect achieved for light spread 204 as seen in FIG. 2A. Thus, by using two optics, both of which have fluted surfaces as shown in FIG. 1A, FIG. 1B, FIG. 1C, the illustrative embodiments provide for adjustable angles of light spread as well as adjustable dimensions of the shape of the light spread.

Figure 1G:
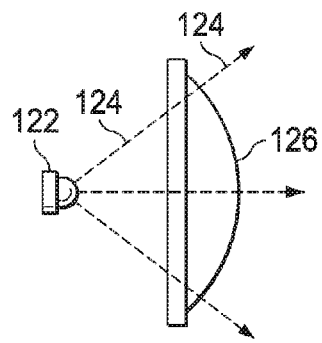
FIG. 1G, FIG. 1H, and FIG. 1I are illustrations of a light source coupled to a plano convex lens optic in accordance with an illustrative embodiment.
Figure 1H:
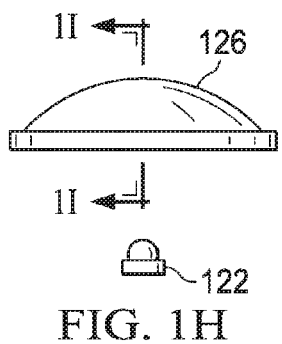
Figure 1I:
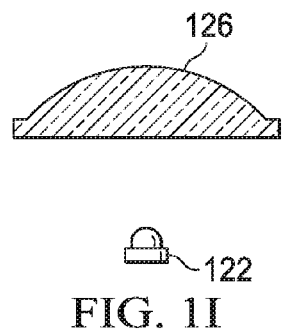

FIG. 1G, FIG. 1H, and FIG. 1I illustrate light source 122 without the use of a TIR optic enclosing the light source as seen in FIG. 1A, FIG. 1B, FIG. 1C, FIG. 1D, FIG. 1E, and FIG. 1F. FIG. 1G, FIG. 1H, and FIG. 1I are provided in the present disclosure. FIG. 1G shows an image of one side of an optic in accordance with an illustrative embodiment. FIG. 1H portrays a view of an optic assembly from a frontal perspective whereby the top and the base of the optic are within view. Thus, the optic assembly in FIG. 1G is also displayed in FIG. 1H as seen from a different perspective visually. Additionally, FIG. 1I illustrates a cross-sectional view of the components of FIG. 1H.

The embodiments shown in FIG. 1G, FIG. 1H, and FIG. 1I provide for use of a plano convex lens as optic 126. Optic 126 may be maneuvered in a linear direction either towards or away from light source 122 in order to alter the angle of light spread for light output 124. In accordance with one embodiment seen in FIG. 1G, FIG. 1H, and FIG. 1I, light source 122 may be an LED.

FIG. 1G illustrates a front view of a plano convex lens 126 located in proximity to light source 122. In FIGS. 1G-1I, the method intended for use with this configuration of optics and light source, would provide for the optic 126 to be manipulated linearly towards or away from light source 122. Other components and elements may be included in a light fixture encompassing a light source, such as light source 122 and optic 126.

Figure 1J:
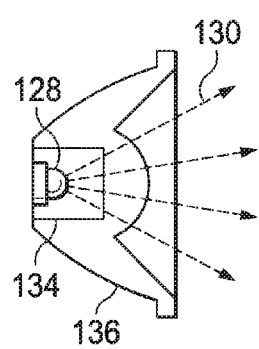
FIG. 1J, FIG. 1K, and FIG. 1L are illustrations of a light source coupled to a total internal reflection optic in accordance with illustrative embodiments.
Figure 1K:
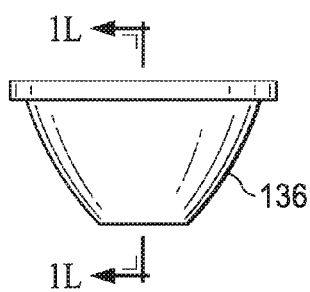
Figure 1L:
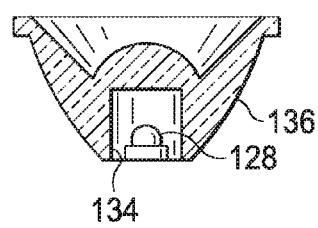

FIG. 1J, FIG. 1K, and FIG. 1L illustrates another method for achieving alterable angle of light spread using a single optic. FIG. 1J, FIG. 1K, and FIG. 1L are provided. FIG. 1J portrays an image of one side of an optic in accordance with an illustrative embodiment. FIG. 1K portrays a view of an optic assembly from a frontal perspective whereby the top and the base of the optic are within view. FIG. 1L depicts an interior cross-section of the optic that is also displayed in FIG. 1J and FIG. 1K. Thus, the optic assembly in FIG. 1J is also displayed in FIG. 1K and FIG. 1L.

FIG. 1J illustrates an embodiment whereby light source 128 is stationary and TIR optic 136 may be manipulated in a linear direction within a range either closer to or further away from light source 128. Channel 134 in the interior of TIR optic 136 allows for TIR optic 136 to move in a linear direction forwards and backwards. By utilizing a TIR optic 136 with light source 128 affixed in the hollow of TIR optic 136, greater efficiency and emission of a focused direction of output of light 130 may be achieved, as compared with FIG. 1G, FIG. 1H, and FIG. 1I. In accordance with an embodiment of the method herein, light source 128 may also be a LED. An LED is illustrated in FIG. 1J as light source 128.

FIG. 1K and FIG. 1L illustrate a front view and a cross-section view of the optics envisioned for use with the method and apparatus connected with the embodiments shown in these figures. In an exemplary embodiment, without limitation as to other possible embodiments, optic 136 is the combination of a plano convex TIR optic. Light source 128 may be fixed to stay stationary within the hollow of optic 136. Channel 134 is a means by which the entire optic 136 may be manipulated to move linearly towards or away from light source 128 while capturing maximum amount of light spread for greater efficiency.

While these embodiments displayed in the above-mentioned figures may be utilized, each offers unique characteristics that vary with the use of either a single optic or a plurality of optics, as well as with the use of a TIR optic. In a preferred embodiment, the optic assembly as portrayed in FIGS. 1J-1L would be utilized since this method and apparatus provides optical-efficiency and the ease of using a single optic. Optical-efficiency refers to reduced amount of light loss originally produced by a light source, such as light source 102, 112, 122, and 128.

It is to be noted that the illustrative embodiments in FIG. 1A allow for the varying of the angle of light spread, as well as the dimensions of the light output are also alterable. FIG. 1A provides for an elliptically shaped output of light versus the conical shape that is typically produced using the embodiments shown in FIG. 1D and FIG. 1G and FIG. 1J. The conical shape is achieved for all three other embodiments shown in FIG. 2B, FIG. 2C, and FIG. 2D.

Figure 3:
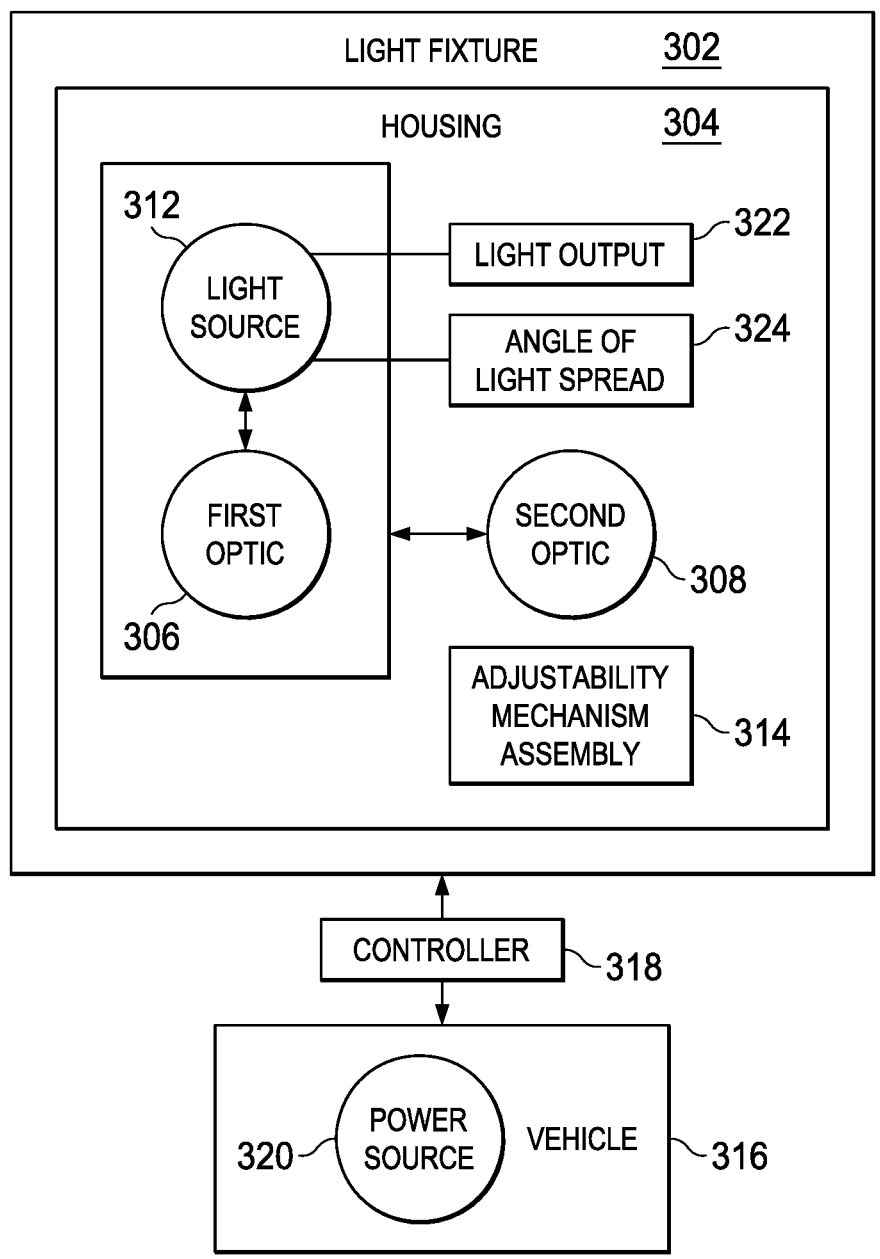
FIG. 3 is a block diagram of components of a light fixture for a vehicle in accordance with an illustrative embodiment.

Furthermore, in accordance with the illustrative embodiments, it is intended that the light sources and optics are contained in a light fixture that may be affixed to a surface of a vehicle. FIG. 3 includes additional embodiments of some of the components included in FIG. 1A, FIG. 1D, FIG. 1G, and FIG. 1J as described as existing within a light fixture for a vehicle.

FIG. 2A, FIG. 2B, FIG. 2C, and FIG. 2D provide a pictorial illustration of the output of light shapes for the embodiments illustrated in FIG. 1A, FIG. 1D, FIG. 1G, and FIG. 1J. Accordingly, the shape of the light output and adjustability of the angle of light spread in FIG. 1A, FIG. 1D, FIG. 1G, and FIG. 1J correlate respectively to FIG. 2A, FIG. 2B, FIG. 2C, and FIG. 2D. Accordingly, the embodiment shown in FIG. 1C correlates to FIG. 2A. The embodiment shown in FIG. 1F correlates to FIG. 2B. The embodiment shown in FIG. 1I correlates to FIG. 2C. Additionally, the embodiment shown in FIG. 1L correlates to FIG. 2D. As used herein, the angle of light spread is a measurement set in degrees. Light beams range from very narrow light spread to various in between designations up to being characterized as a wide flood light spread. The angle of light spread can indicate in numerical measurements whether a light beam can be considered to be a narrow spot light or a wide flood light and all the range of designations in between.

FIG. 2A, FIG. 2B, FIG. 2C, and FIG. 2D illustrate both the narrow spotlight and widest flood beam that each of the embodiments shown in FIG. 1A, FIG. 1D, FIG. 1G, and FIG. 1J may produce depending on the placement of their integral components and optics. Light spread 202, 206, 210, and 214 in FIG. 2A, FIG. 2B, FIG. 2D, and FIG. 2C, respectively, are intended to illustrate a narrow spot light or what is sometimes described to be a very narrow spot light. Such spot lights may be described often as being less than 7 degrees in measurement. In a preferred embodiment of an ideal method and system, it is intended that the narrow spotlight of light spread 202, 206, 210, and 214, be capable of achieving, but is not limited to, a measurement of at least a 5×5 degree of light spread. This would achieve a very narrow spot light effect.

At the end of the other spectrum, light spread 204, 208, 212, and 216 represent a flood light spread or a wide flood light achieved using the same components that were used to achieve a narrow spot light. A flood light as measured in degrees is oftentimes considered to exist at least when the light spread produced from the light source is at least 60 degrees.

FIG. 2A displays an elliptically shaped output of light due to the linear adjustment of a second fluted optic 108 as seen in FIG. 1A-1C. Additionally, because light spread 204 is represented as a wide flood light, the position of second fluted optic 108 is at its farthest from first optic 106. It is noticeable that the flutes are vertically aligned, thus producing a horizontally oriented elliptical shape for the output of light in FIG. 2A. FIG. 2A provides versatility in the orientation and overall dimensions of the output of light as well as providing a range of angle of light spreads to produce a range of very narrow spot lights to wide flood lights in a single light fixture to suit the needs of the driver of the vehicle.

Spot lights tend to be used to highlight a particularly smaller area. Spot lights serve to define and focus in on a narrower area that needs lighting. Flood lights provide general lighting of a wider to a much wider area and allow a viewer to see over a larger area, without as much highlighting and focus as a spot light. The light beams are projected over either a very narrow range to produce a spot light or over a wider range to produce a flood light.

Turning to FIG. 3, a block diagram describing the components of an auxiliary light fixture for a vehicle are described in accordance with an illustrative embodiment. The different embodiments shown in FIG. 1A and FIG. 1D and FIG. 2A-FIG. 2B may be configured to operate in accordance with components present in FIG. 3.

FIG. 3 includes vehicle 316. In a general embodiment, vehicle 316 may be any type of automobile. Vehicle 316 may also be a vehicle that is utilized as an emergency vehicle. In a preferred embodiment, vehicle 316 may be described as an off-road vehicle. While well-suited to an off-road vehicle, lighting fixture 302 may also clearly be utilized in any type of automobile to suit the needs of its driver, including for driving in a city or suburban or agricultural setting. No limitations are placed herein on the use of light fixture 302 or vehicle 316.

Light fixture 302 is an enclosed apparatus containing light source 312. In accordance with different illustrative embodiments, a preferred method includes using a set of light emitting diodes or LEDs as known in the field to serve for light source 312. Light fixture 302 may also be functionally equivalent to and described as a light stick, light bar head, light bar module, and/or LED light bar.

Light output 322 refers to the output as well as the overall shape of light beam projected by light source 312 as well as after the light beams are projected through any optics, such as first optic 306. Light output 322 is thus the resulting effect of light after passing through any surfaces after emission from light source 312. Angle of light spread 324 refers to the angle of light spread of light output 322. As previously described, angle of light spread 324 is usually measured in degrees. Additionally, angle of light spread 324 is described in terms of very narrow to narrow spot light and proceeds through various characterizations of narrow light until a flood light results because a particular range of degrees is achieved. Spot lights are usually meant to define or highlight a narrow area in front of a light source. Flood lights provide a wider view and general area of lighting in front of a light source. In a preferred embodiment, it is intended that the method and apparatus described herein may achieve a narrow spot light of at least 5×5 degrees and a wide flood light of at least but not limited to 60×60 degrees, as depicted in FIGS. 2A-2D. Nevertheless, this is meant to be exemplary, and not a limitation in any way on the dimensions or angles achieved for the angle of light spread 324 or light output 322.

Housing 304 is meant to describe part of the overall structure containing the components of light fixture 302. Housing 304 may be part of the overall apparatus. In some embodiments, housing 304 may be coupled with light fixture 302. Light fixture 302 may ultimately be installed as an aftermarket accessory or with the vehicle. Light fixture 302 is intended in the different embodiments to include components for installation of light fixture 302 onto a surface of a vehicle. There are no limitations as to the placement of light fixture 302.

Power source 320 provides the power to the unit of light fixture 302. In accordance with some embodiments of the invention, power source 320 may be the power distribution system of a vehicle which is commonly known to one of ordinary skill in the art as a car battery. Light fixture 302 will include a component for connecting to the car battery or power ports in a vehicle, such as vehicle 316.

First optic 306 and second optic 308 are a set of optical devices, whose surface features and material allow for the transfer and distribution of light through the optical device. In accordance with the illustrative embodiments, such optical devices as used herein are different types of lenses. First optic 306 and second optic 308 have the capability to converge and diverge light beams emitted from light source 312. As utilized herein, the term "set" may refer to at least one or more of an item. Accordingly, a set of first optic 306 or a set of second optic 308 may apply to a plurality of these optics. It is intended that light fixture 302 include a set of first optics and a set of second optics to produce a light fixture of any size to suit the various needs of a user.

FIG. 1A, FIG. 1B, and FIG. 1C show optic 106 which is a fluted lens and optic 108. The term fluted as used herein and previously described refers to lines or ridges embedded in the surface of an optic lens. The "flutes" assist with diffusion of light from light source 312.

FIG. 1D, FIG. 1E, and FIG. 1F have two optics as well, which are first optic 118 and second optic 120. In accordance with one preferred embodiment, second optic 120 is a plano concave lens. A plano concave lens is typically flat on one side and curves inwardly on another side. First optic 118 operates as a converging lens in conjunction with TIR optic 106.

TIR optic 106 (TIR as used herein is a total internal reflection optic) and 118 in FIG. 1A and FIG. 1D are exemplary embodiments of an internal reflective optics 306 in FIG. 3. An internal reflection optic is meant to refer to a optic enclosing light source 312 in a suitable shape and with appropriate materials to enhance the output of light from light source 312. When the light output from light source 312 makes contact with the interior sides of an internal reflection optic, such as first optic 306, less light is lost, i.e. greater optical-efficiency, because a greater percentage of the light may be seen illuminating the area. In different embodiments, first optic 306 may come in different shapes, including but not limited to, parabolic, conical, circular, or triangular in shape.

The inclusion of first optic 306 and second optic 308 in association with adjustability mechanism assembly 314 enables the implementation of the adjustability of the light beams emitted from light source 312. In accordance with the methods previously described as FIG. 1A and FIG. 1D and FIG. 2A and FIG. 2B, when second optic lens 308 is moved in a linear direction towards or away from light source 312, the light beams emitted become variable in angle of light spread. In prior art, a user solely had the option to purchase auxiliary vehicle lighting that did not provide any options after installation for varying angle of light spread 324 once the auxiliary vehicle lighting was installed on the vehicle. A driver thus needed to select either a flood light or a narrow spot light or install multiple units to provide multiple angles of light spread.

The present embodiments provide several methods and apparatus configurations for achieving the useful and beneficial effect of varying the angle of light spread as well as shape of light output. By combining adjustability mechanism assembly 314 capable of manipulating the position of second optic 308 further away from first optic 306, a wider light effect may be achieved. By combining adjustability mechanism assembly 314 capable of manipulating the position of second optic 308 closer to first optic 306 on a linear axis, a narrower light spread effect may be achieved.

Because of the nature of electromechanical devices, there is a range within which a user may adjust the set of light beams emitted from light source 312, whereby the range will move from narrowest to widest. It is intended herein that a user may progressively adjust second optic lens 308 between a maximum point that is closest to light source 312 in order to produce a spot light and a maximum point farthest away from light source 312 in order to produce a flood light.

Figure 5A:
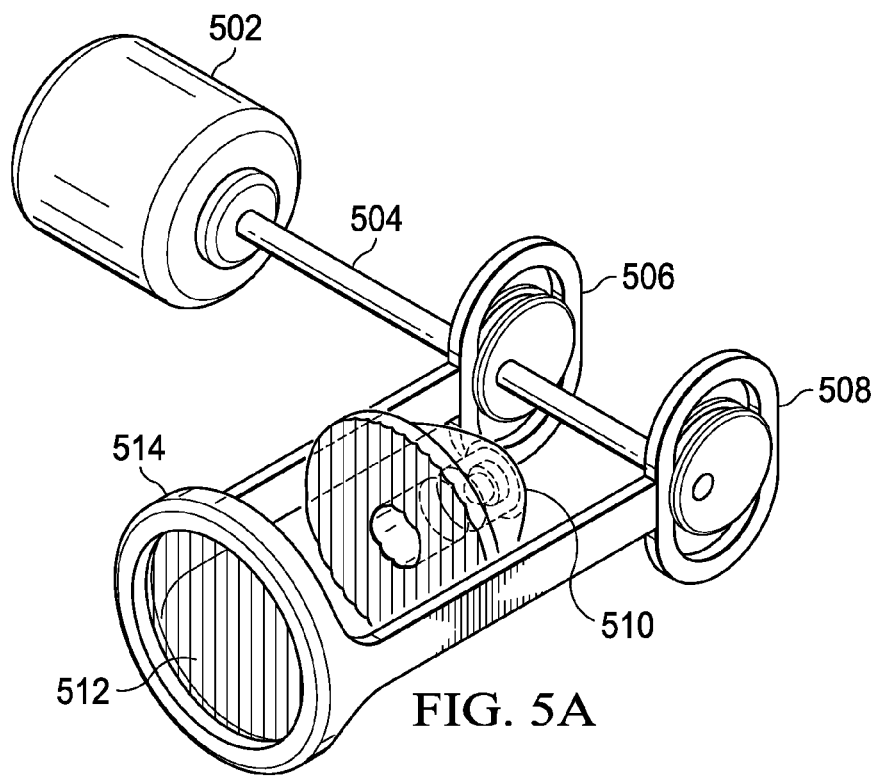
FIG. 5A is an illustration of an optic adapted to operate with an adjustability mechanism assembly in accordance with an illustrative embodiment.
Figure 5B:
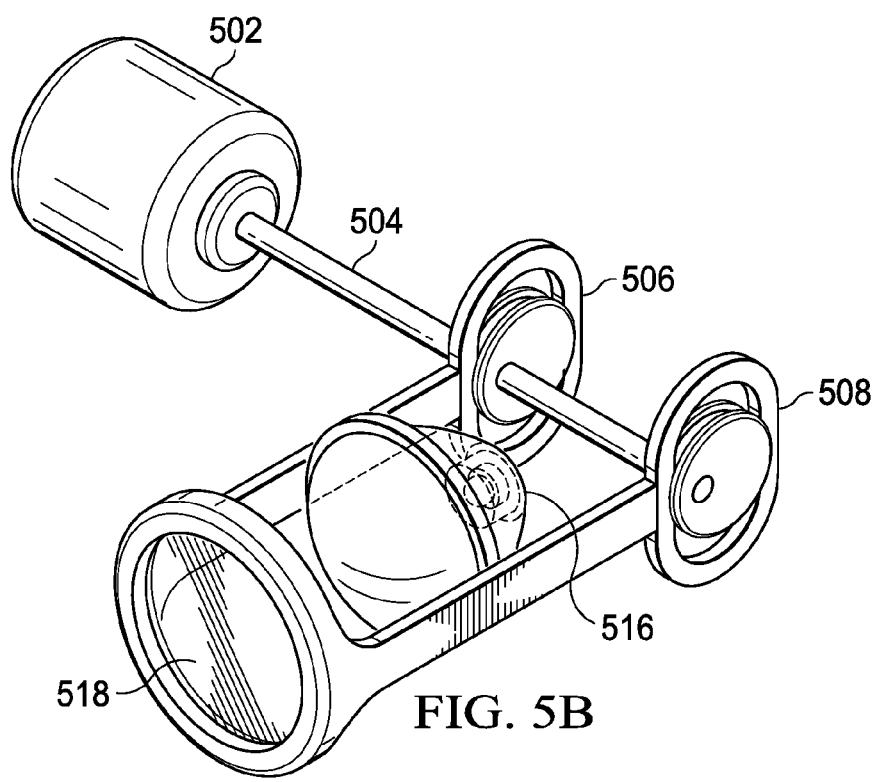
FIG. 5B is an illustration of an optic adapted to operate with an adjustability mechanism assembly in accordance with an illustrative embodiment.

Adjustability mechanism assembly 314 is intended to describe the mechanics of how second optic 308 is moved towards or away from first optic 306. In FIG. 5A and FIG. 5B, illustrative embodiments are included that illustrate utilizing motor 502, shaft 504, cams 506 and 508, in conjunction with a first and second optic. It is intended that adjustability mechanism assembly 314 may allow for various iterations and means of causing second optic 308 to be moved along a horizontal axis as needed to produce the desired angle of light spread or shape of output of light. FIG. 5A and FIG. 5B may include further embodiment description of adjustability mechanism assembly 314.

Controller 318 provides the mechanism for either an automatic or manual manipulation of the position of second optic 308 with respect to first optic 306. In one embodiment, a selector of some type is coupled to the light fixture. A user may manually control the angle of light spread by manually turning or pressing the selector for regulating the angle of light spread.

Figure 6:
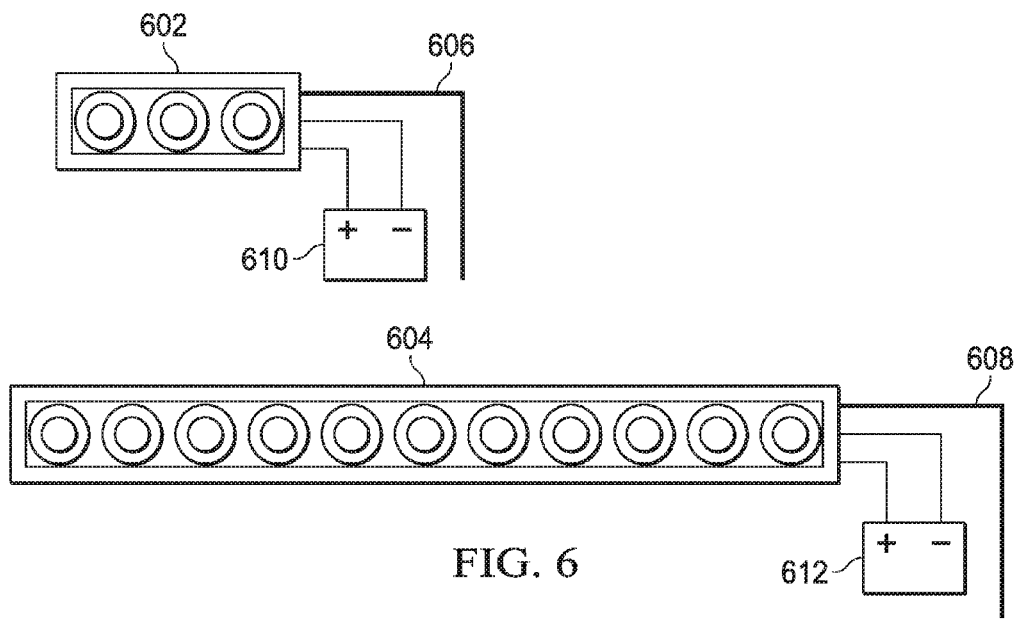
FIG. 6 is a pictorial illustration of light fixtures and a controller via programmable wire in accordance with an illustrative embodiment.
Figure 7:
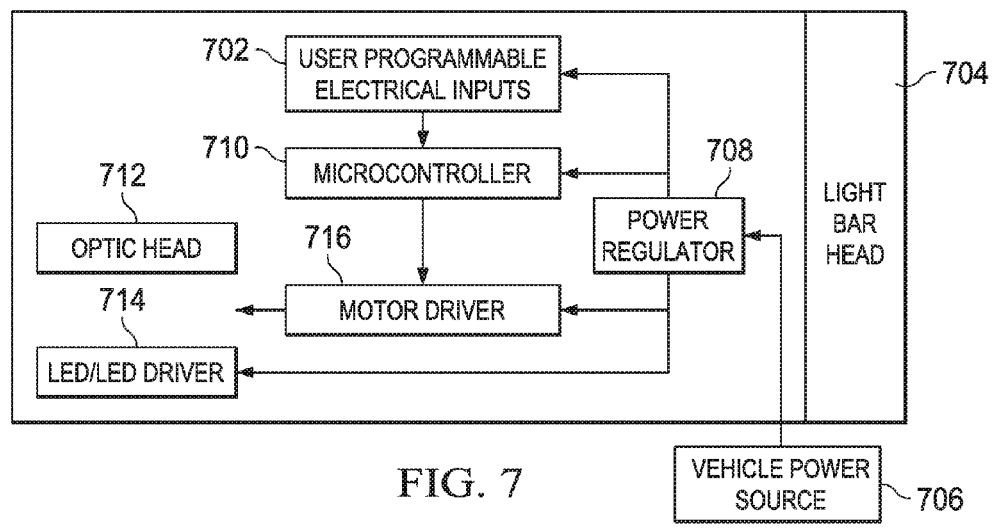
FIG. 7 is a block diagram of a controller utilizing a programmable wire for a light fixture for a vehicle in accordance with an illustrative embodiment.

In other embodiments, controller 318 is a programmable wire that projects from light fixture 302 and may be connected to power source 320 for setting a particular angle of light spread 324. FIG. 6 and FIG. 7 show this embodiment in greater detail.

Additionally, in accordance with some embodiments, controller 318 may be connected to light fixture 302 either wirelessly or through a wired connection. FIG. 10 displays a controller that may be wirelessly connected to a configuration of a light fixture, such as light fixture 302. Controller 318 may be a mechanism or a selector connected to light fixture 302, which is further described and illustrated in FIGS. 8-11.

Figure 4:
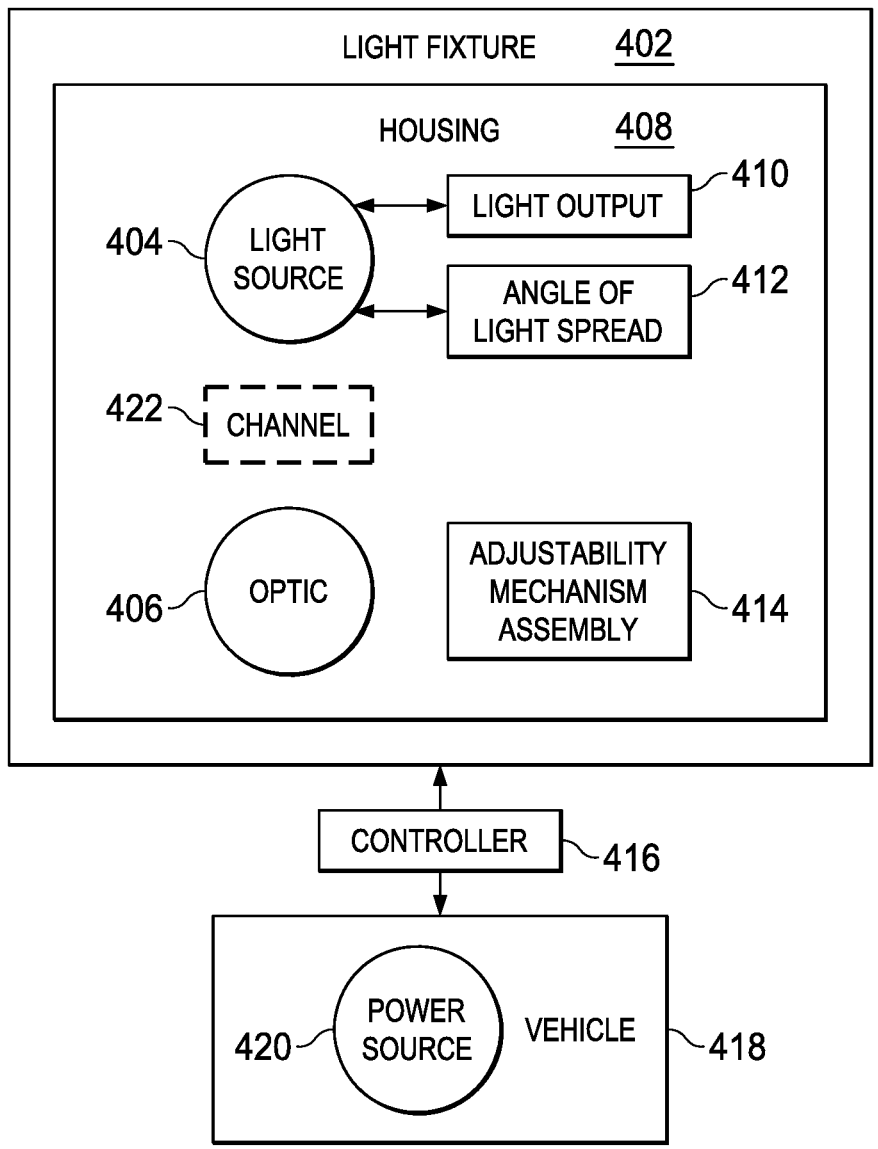
FIG. 4 is a block diagram of components of a light fixture for a vehicle in accordance with an illustrative embodiment.

Turning to FIG. 4, a block diagram describing the components of an auxiliary light fixture for a vehicle are described in accordance with an illustrative embodiment. The different embodiments for FIG. 1G and FIG. 1J and FIG. 2C and FIG. 2D may be configured to operate in accordance with components present in FIG. 4.

Light fixture 402 may be utilized as an auxiliary light fixture for any type of vehicle. In a general embodiment, vehicle 418 may be any type of automobile. Vehicle 418 may also be a vehicle that is utilized as an emergency vehicle. In a preferred embodiment, vehicle 418 may be described as an off-road vehicle. Off-road vehicles frequently travel over rough terrain in dark conditions, and have need for a light fixture, such as light fixture 402, capable of adjusting from a narrow angle spot light to a wide angle flood light.

While well-suited to an off-road vehicle, lighting fixture 402 may also clearly be utilized in any type of automobile to suit the needs of its driver, including for driving in a city or suburban or agricultural setting. No limitations are placed herein on the use of light fixture 402 or vehicle 418.

Light fixture 402 is an enclosed apparatus containing light source 404. In accordance with different illustrative embodiments, a preferred method includes using a set of light emitting diodes or LEDs as known in the field. The term set as used herein may refer to a singular component or plural. Light emitting diodes come in various sizes, but are often small and compact and easy to assemble in series. Light emitting diodes provide significant lighting options and brightness in terms of lumens.

Light output 410 refers to the output as well as the overall shape of light beam projected by light source 404 as well as after the light beams are projected through any optics, such as Optic 406. Light output 410 is thus the resulting effect of light after passing through any surfaces after emission from light source 404. Angle of light spread 412 refers to the angle of light spread of light output 410. As previously described, angle of light spread 412 is usually measured in degrees. Additionally, angle of light spread 412 is described in terms of very narrow to narrow spot light and proceeds through various characterizations of narrow light until a flood light results because a particular range of degrees is achieved. Spot lights are usually meant to define or highlight a narrow area in front of a light source. Flood lights provide a wider view and general area of lighting in front of a light source. In a preferred embodiment, it is intended that the method and apparatus described herein may achieve at least a narrow spot light of at least 5×5 degrees and a wide flood light of at least but not limited to 60×60 degrees, as depicted in FIGS. 2A-2D. Nevertheless, this is meant to be exemplary, and not a limitation in any way on the dimensions or angles achieved for the angle of light spread 412 or light output 410.

Housing 408 is meant to describe part of the overall structure containing the components of light fixture 402. Housing 408 may be part of the overall apparatus. In some embodiments, housing 408 may be coupled with light fixture 402. Light fixture 402 may ultimately be installed as an aftermarket accessory or with the vehicle. Light fixture 402 is intended in the different embodiments to include components for installation of light fixture 402 onto a surface of a vehicle. Typically, light fixtures, such as light fixture 402, may be mounted to the front of a vehicle's surface, the roof of a vehicle, mounted on a side of a vehicle or on a side mirror to provide accent and additional lighting. However, there are no limitations as to the placement of light fixture 402.

Power source 420 provides the power to the unit of light fixture 402. In accordance with some embodiments of the invention, power source 420 may be the power distribution system of a vehicle which is commonly known to one of ordinary skill in the art as a car battery. Light fixture 402 will include a component for connecting to the car battery or power ports in a vehicle, such as vehicle 418.

Optic 406 is an optic whose surface features and material allow for the transfer and distribution of light through the optical device. In accordance with the illustrative embodiments, such optical devices as used herein are different types of lenses. A set of optics, such as optic 406 has the capability to converge and diverge light beams emitted from light source 404. As utilized herein, the term "set" may refer to at least one or more of an item. Accordingly, a set may apply to a plurality of these optics. It is intended that light fixture 402 includes a set of optics, such as optic 406, that of any size to suit the various needs of a user.

In accordance with the embodiments shown in FIG. 1G and FIG. 1J, FIG. 4 provides a block diagram of components that may be used to achieve a variable light output, when a single optic is positioned relative to a light source. Channel 422, as discussed above in paragraph 38, is a channel that may exist when using the method and apparatus as shown in FIG. 1J. Channel 422 may be similar to channel 134 shown in FIG. 1L. Channel 422 is located within the interior of optic 406, which is intended to be a TIR optic. Channel 422 allows for optic 406 to move in a linear direction forwards and backwards. By utilizing optic 406 and a light source, such as light source 404, affixed in the hollow base of optic 406, greater efficiency and emission of a focused direction of output of light 410 may be achieved, as compared with the embodiment shown in FIG. 1I.

In some embodiments, optic 406 may be a free-standing optic, and not necessarily a total internal reflection optic. This method and apparatus is reflected as the embodiments shown in FIG. 1G, FIG. 1H, and FIG. 1I. In such an embodiment, an optic, such as optic 406, is substantially aligned with the light emitting side of light source 404 and located along a horizontal axis on a mechanism that allows for optic 406 to be moved linearly towards and away from light source 404. However, the preferred method and apparatus would include a total internal reflection optic, as this may be more efficient. In such embodiments, adjustability mechanism assembly 414 may still be used to affect the position of optic 406 with respect to light source 404.

Figure 5C:
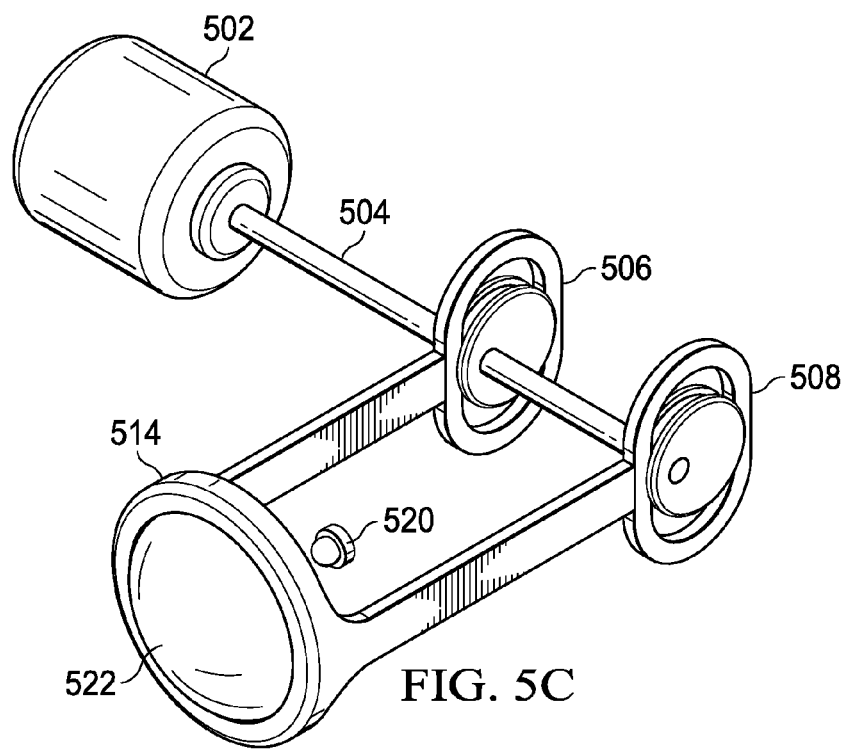
FIG. 5C is an illustration of an optic adapted to operate with an adjustability mechanism assembly in accordance with an illustrative embodiment.
Figure 5D:
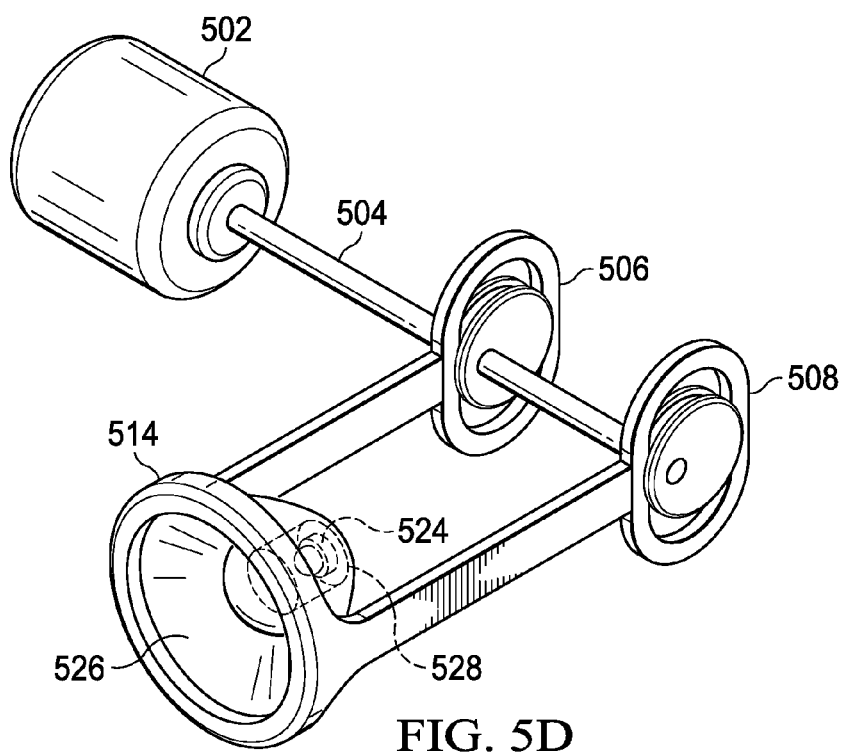
FIG. 5D is an illustration of an optic adapted to operate with an adjustability mechanism assembly in accordance with an illustrative embodiment.

Adjustability mechanism assembly 414 is intended to describe the mechanics of how optic 406 is moved towards or away from light source 404. In FIG. 5C and FIG. 5D, one illustrative embodiment is included that illustrates utilizing motor 502, shaft 504, cam 506, in conjunction with an optic. It is intended that adjustability mechanism assembly 414 may allow for various iterations and means of causing optic 406 to be moved along a horizontal axis as needed to produce the desired angle of light spread or shape of output of light. FIG. 5C and FIG. 5D include a further embodiment description of adjustability mechanism assembly 414.

Controller 416 provides the mechanism for either an automatic or manual manipulation of the position of optic 406 with respect to light source 404. In one embodiment, a selector of some type is coupled to the light fixture. A user may manually control the angle of light spread by manually turning or pressing the selector for regulating the angle of light spread.

In other embodiments, controller 416 is a programmable wire that projects from light fixture 402 and may be connected to power source 420 for setting a particular angle of light spread 412. FIG. 6 and FIG. 7 describe this embodiment in greater detail.

Figure 10:
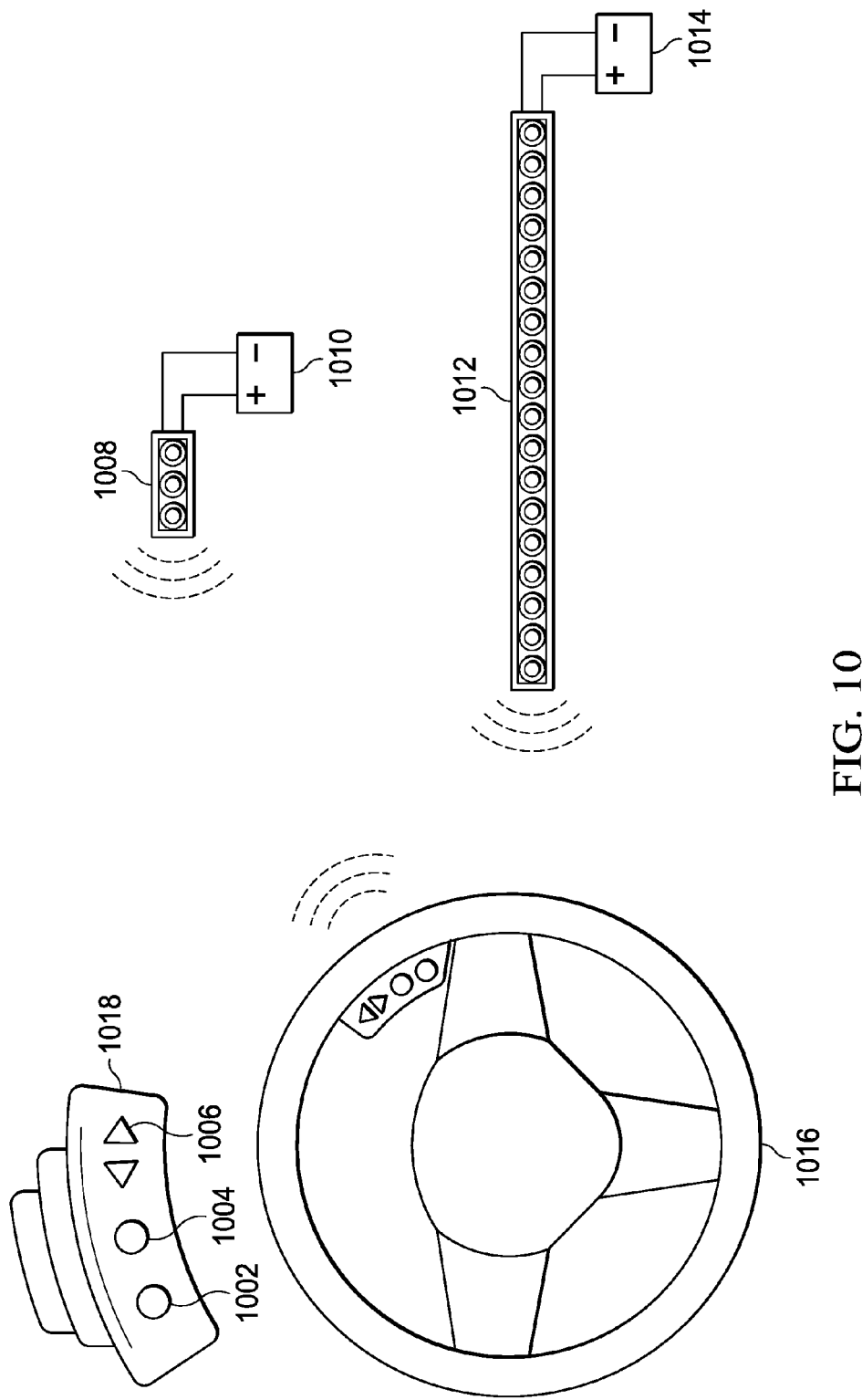
FIG. 10 is an illustration of a wireless controller with additional components for use with a light fixture in accordance with an illustrative embodiment.
Figure 11:
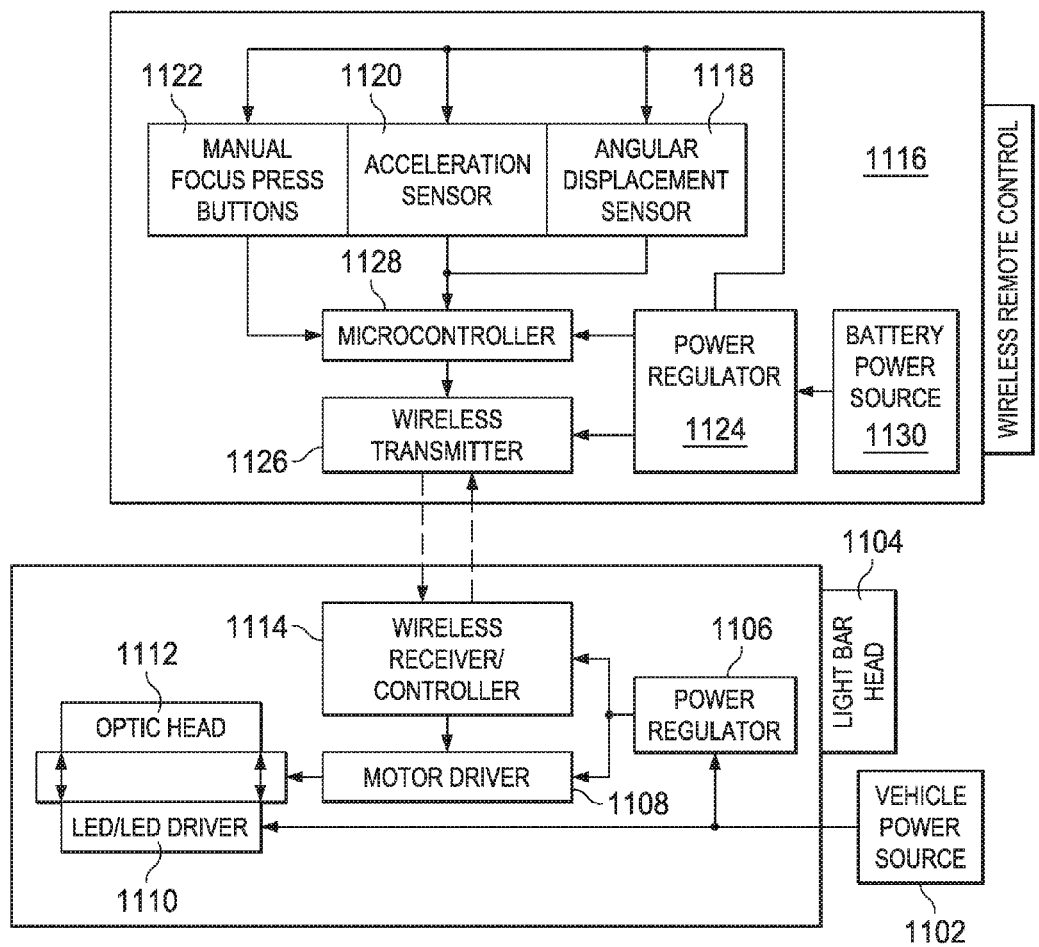
FIG. 11 is a block diagram of a wireless controller with additional components for use with a light fixture in accordance with an illustrative embodiment.

Additionally, in accordance with some embodiments, controller 416 may be connected to light fixture 402 either wirelessly or through a wired connection. FIGS. 10 and 11 display a controller that may be wirelessly connected to a configuration of a light fixture, such as light fixture 402. Controller 416 may be a mechanism or a selector connected to light fixture 402, which is further described and illustrated in FIGS. 8-11.

Turning to FIG. 5A-FIG. 5B, FIG. 5A-FIG. 5B provide pictorial illustrations of adjustability mechanism assemblies, and may be utilized in some embodiments for adjustability mechanism assembly 314 and 414. In FIG. 5A is an illustration of motor 502, shaft 504, cams 506 and 508, and moveable arm 514. These elements are utilized to adjust with the mechanical operation of second optic 512.

In some embodiments, motor 502 may be configured to reside within an interior portion of light fixture that is attachable to a surface of a vehicle, such as light fixture 302 and vehicle 316. However, depending on various designs and configurations, motor 502 may also be configured to be attached to the exterior of light fixture 302 or even to be remotely connected to light fixture 302 in other configurations. Motor 502 may be created using various existing motors. A preferred embodiment utilizes a servo motor, which provides information about the specific location an optic is positioned and the exact degrees achieved for angle of light spread. Another embodiment uses a stepper motor. Various motors involve other considerations including cost of the motor and overall design, however, it is intended that in some embodiments, a motor machine is used to generate power from power source 320 to the other moving parts of adjustability mechanism assembly 314. The other moving parts herein include shaft 504, cams 506 and 508, and moveable arm 514. The generation of power through motor 502 using these additional components allows for second optic 512 to be moved closer or farther away from first optic 510. FIG. 5A provides an exemplary adjustability mechanism to use along with the optic assembly illustrated in FIG. 1A, FIG. 1B, and FIG. 1C.

Accordingly, FIG. 5B illustrates optic 516 and 518 which correlate to optic 118 and 120 shown in FIG. 1D, FIG. 1E, and FIG. 1F. FIG. 5C correlates to the embodiments illustrated in FIG. 1G, FIG. 1H, and FIG. 1I. LED 520 as pictured in FIG. 5C may correlate to a method of use of LED 122 as illustrated in FIG. 1G, FIG. 1H, and FIG. 1I. The optic 522 in FIG. 5C is described in one preferred embodiment to be a plano-convex lens, and is also illustrated as optic 126 in FIG. 1H.

FIG. 5D illustrates an embodiment in accordance with the embodiments shown in FIG. 1J, FIG. 1K, and FIG. 1L. In FIG. 5D, LED 524 correlates to LED 128 in FIG. 1J. Channel 528 correlates to channel 134 in FIG. 1L. In accordance with an embodiment as previously described for the embodiments shown in FIG. 1J, FIG. 1K, and FIG. 1L, TIR and plano convex optic 526 may be manipulated to move towards LED 524, whereby LED 524 is fixedly located within channel 528.

In accordance with an embodiment, the optics and corresponding components as illustrated in FIG. 5A, FIG. 5B, FIG. 5C, and FIG. 5D may be configured to operate in conjunction with a motor, such as motor 502, cams, such as cams 506 and 508, and a movable horizontal arm such as arm 514. Additional components and elements may be needed or provided for combining the components of FIGS. 5A-5D together. This illustration provides for one embodiment, but is not intended to be exhaustive of the mechanics of any manner for adjusting the position of the optics with respect to the light sources or LEDs.

Turning to FIG. 6, a method for controlling an adjustability mechanism assembly is provided, such as adjustability mechanism assembly 314 in FIG. 3. The "controller" in FIG. 6 is a programmable wire that extends from the surface of the light fixtures 602 and 604. Light fixture 604 is larger in dimensions than light fixture 602 to indicate that it is intended that the different embodiments may be applicable to light fixtures of varying sizes. Otherwise, light fixture 602 and 604 may operate following the same method and using the same components.

Programmable wire 606 and programmable wire 608 each operate as a wire that may be electrically connected. The power source in a vehicle is typically the vehicle battery, which has a positive and negative port. The method for controlling or activating the adjustability mechanism assembly for the optics in light fixture 602 and light fixture 608 is to tap programmable wire 606 and 608 against power source 610 or 612. By providing such user electrical inputs, the optics in a light fixture, such as light fixtures 602 and 604, may be moved to positions desirable by the user to produce a particular angle of light spread.

FIG. 7 displays a block diagram of components used in conjunction with the method described in FIG. 6 in accordance with some illustrative embodiments. Light bar head 704 is an equivalent term to light fixture as utilized in FIGS. 1-6. Light bar head 704 is equivalent in meaning to light fixtures 602 and 604. Optic head 712 refers to the series of second optics located within light bar head 704. Optic head 712 may be a term to generally refer to the set of second optics utilized in light bar head 704 and in accordance with further discussion regarding second optic 308. User programmable electrical inputs 702 are the inputs provided when a user utilizes the method as described in FIG. 6 to electrically program the optic head to move to a position as desired by the user to achieve a particular angle of light spread. A programmable wire, such as programmable wires 606 and 608 may be put in contact with a power source, such as a car battery and vehicle power source 706 in order to detect the programmable electrical inputs from the user.

Further elements of an embodiment of a light stick utilizing such a controller may include a microcontroller, such as microcontroller 710 and a power regulator, such as power regulator 708. A power regulator may serve to control the power distribution path. In addition, the power regulator may provide additional functions such as filtering power noise coming from the vehicle power source, providing safety measures against installation mistakes, regulating voltage levels for devices requiring different operating voltages and limiting the current draw.

LED/LED Driver 714 may be utilized to operate LEDS when LEDS are utilized as the light source. Motor driver 716 is also pictured in FIG. 7. A motor driver, such as motor driver 716, may serve to control the speed of rotation of an attached motor unit, such as motor 502 pictured in FIG. 5. Furthermore, a motor driver, such as motor driver 716, may control the direction of rotation, limit power during motor stalls and regulate the amount of current drawn.

Accordingly, FIGS. 6 and 7 provided for a controller that consists of a programmable wire and a power source to activate the optics within a light fixture configured to operate in accordance with the methods as described for the embodiments shown in FIG. 1A-FIG. 4.

Figure 8:
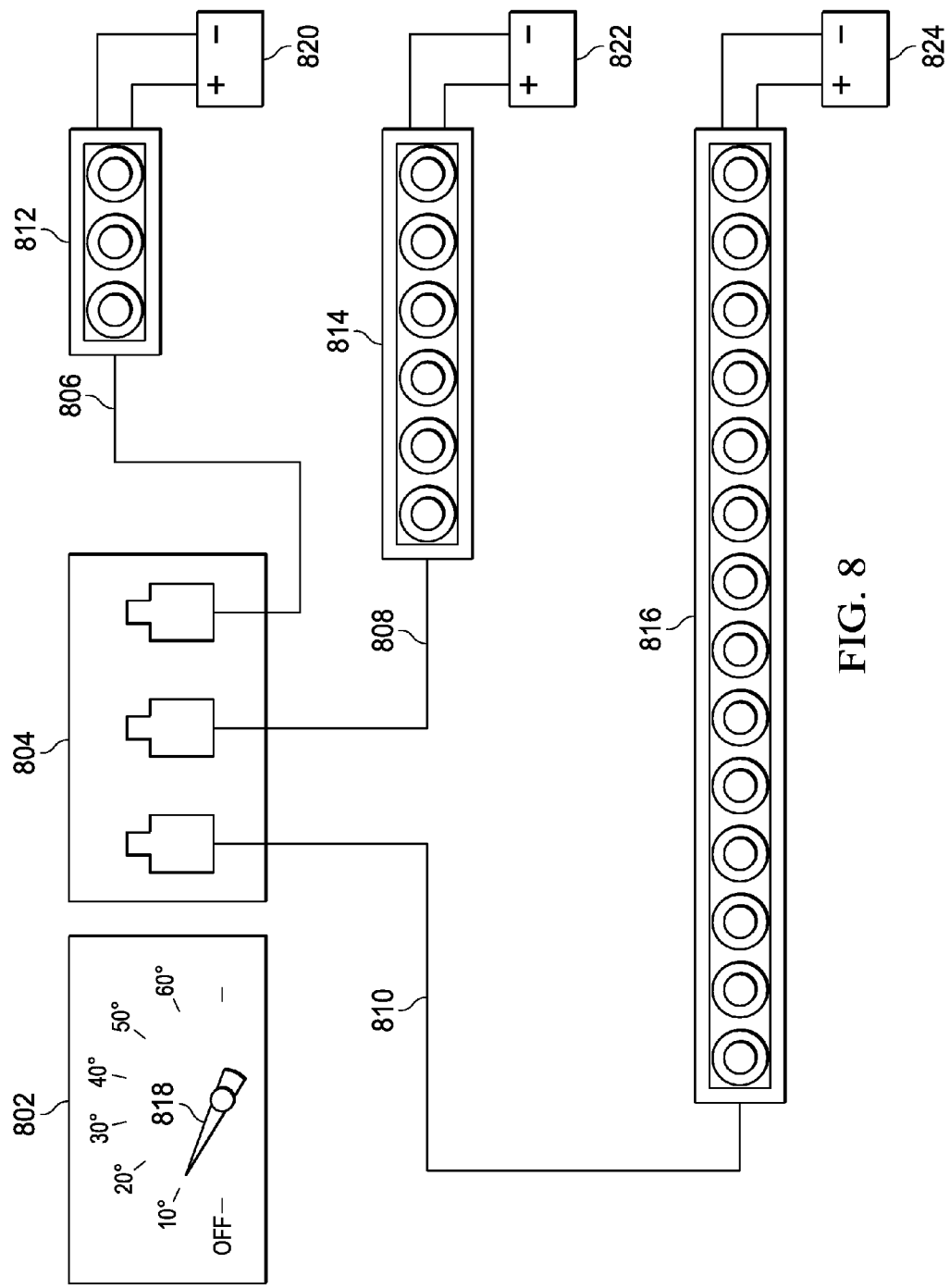
FIG. 8 is an illustration of a wired controller for a light fixture for a vehicle in accordance with an illustrative embodiment.

FIG. 8 shows another type of controller used to maneuver the optics in a light fixture and select a particular angle of light spread. Controller 802 is a wired controller, and may include in one or more embodiments connecting wires 806, 808, and 810 which may connect controller 802 to one or more light fixtures, such as light fixtures 812, 814, and 816. Controller Front 802 is displayed with a user controlled knob or selector 818. A user is enabled to turn the knob or selector 818 to a particular set of degrees. The set of degrees as displayed on the controller front 802 interface in FIG. 8 is pictured as ranging from ten degrees to sixty degrees. This is meant not as a limitation on the embodiments but as an example. A ten degree selection on controller front 802 would indicate that the user desires to produce a spotlight effect with the light fixture coupled to controller front 802. The user has the option to also turn the knob or selector 818 all the way to sixty degrees in order to achieve a flood light effect with the same light fixture unit.

Controller Back 804 is pictured for exemplary purposes as a rear view of an embodiment of controller 802. As is illustrated, there is a wired remote control connection through the ports pictured as located on controller back 804. In one or more embodiments, connecting wires 806, 808, and 810 may connect to the one or more ports included on controller 802 and shown on controller back 804. Three light fixtures are included in FIG. 8. Light fixture 812, light fixture 814, and light fixture 816, indicating that such a controller, as controller 802 is capable of controlling one or more light fixtures at the same time keeping the focused light of the one or more light fixtures light spread at the same angle of light spread. Thus, when the user selects the ten degrees on the controller front 802, the angle of light spread for any of the light fixtures 812, 814, and 816 that are connected to controller 802, may all be set to ten degree setting. In another embodiment, controller 802 may only be connected to a single light fixture unit. The user may also turn off the light fixtures at any time by turning the user knob or selector 818 to the "Off" position on the front interface of controller 802, which has been pictorially illustrated in FIG. 8. Additionally, controller 802 will receive its power from the set of light fixtures that controller 802 may be connected to, because the light fixtures are already connected to a power source, as indicated by the car battery 820, 822, and 824. This figure of a wired controller is meant to illustrate the type of controller that a user may choose to install in the interior of his or her vehicle or at least keep in close proximity to the user. The user is thus able to dynamically and selectively control the angle of light spread for the light fixtures that are coupled to controller rear 804. Accordingly, FIG. 8 illustrates the benefits and usefulness of some of the inventive concepts as described herein.

A user may control a single or many light fixtures with a single controller to achieve a much greater range of light output options in terms of angle of light spread. When coupling multiple light fixtures together on a vehicle, the user is provided with even greater and more amplified light output to view the surrounding area. As previously discussed, if the vehicle is an off-road vehicle or an emergency vehicle, such additional light power and range of light spread can be very useful for driving under various conditions and over difficult terrain.

Figure 9:
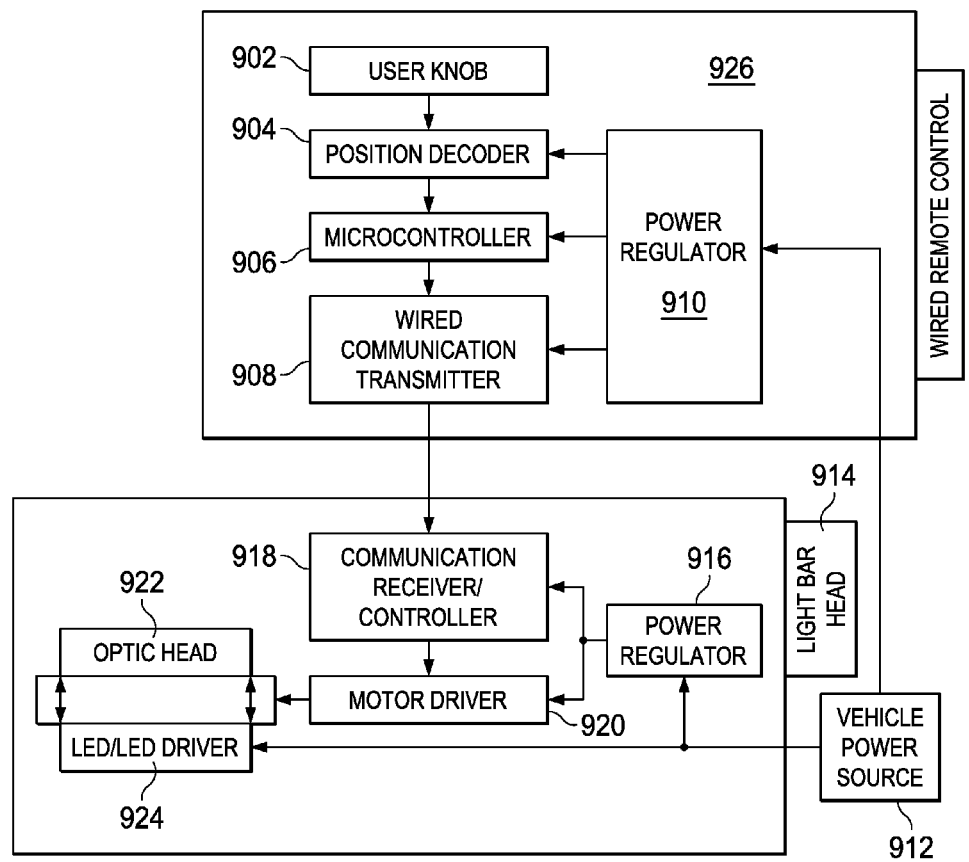
FIG. 9 is a block diagram of a wired controller for a light fixture for a vehicle in accordance with an illustrative embodiment.

FIG. 9 is a block diagram with several envisioned components to achieve the controller described in FIG. 8, in accordance with some illustrative embodiments. FIG. 9 is a block diagram for a wired controller, as pictured in FIG. 8 as controller 802 and 804. User knob 902 is a selector enabling a user to control the angle of light spread of any light fixtures or light sticks that are connected to controller 926. Position decoder 904 deciphers the user input from user knob 902 to determine where to position optic head 922 in light bar head 914. A position decoder, such as position decoder 904, may further be used to read and communicate back to microcontroller 906 the position of user knob 902. A microcontroller is included as microcontroller 906. Wired communication transmitter 908 relays data obtained from user knob 902 to communication receiver/controller 918 to relay to optic head 922. Additional components may be added to the machines listed in FIG. 9 and substitutions may be made. FIG. 9 is not an exhaustive list of components that may be utilized in conjunction with controller 802 and light fixtures 812, 814, and 816, but rather serves to illustrate an embodiment of such items. In one or more embodiments, controller 926 may further include a power regulator, such as power regulator 910, which may be coupled to vehicle power source 912 in one or more embodiments. Further, as shown in FIG. 9, in one or more embodiments, light bar head 914 may further include a power regulator, such as power regulator 916, a motor driver, such as motor driver 920, an LED/LED driver, such as LED/LED driver 924. Motor driver 920 and LED/LED driver 924 may operate as known those of ordinary skill in the art and further in accordance with the description included above.

Turning now to FIG. 10, an additional method of controlling the optics for adjusting the angle of light spread is illustrated herein. FIG. 10 illustrates another exemplary controller system. In FIG. 10, a controller mount is pictured. Controller mount 1018 is a wireless controller. Controller mount 1018 includes a wireless transmitter for transmitting data recorded using components internal to controller mount 1018. A light fixture, such as light fixture 1008 or 1012 further includes a wireless receiver for receiving data transmitted from the wireless transmitter in controller mount 1018, which is further illustrated in FIG. 10.

Controller mount 1018 further includes a built in acceleration sensor and an angular displacement sensor. It is intended that the embodiment pictured herein is configured to obtain data regarding the recorded speed of the vehicle in which controller mount 1018 is mounted. Such data regarding the speed may then be utilized to automatically adjust and set the angle of light spread to a pre-determined angle that may be the best suited to assist a driver moving over terrain at that particular speed. For example, if a driver is moving very fast, the driver may prefer a spot light beam to that of a flood light beam so that the driver has a greater visibility over a longer distance. The acceleration sensor built into controller mount 1018 has the capability of transmitting wirelessly this data to the light fixture coupled to the vehicle.

Controller mount 1018 is pictured in FIG. 10 as mounted to the steering wheel, steering wheel 1016. Controller mount 1018 in various embodiments may be permanently attached or temporarily attached to steering wheel 1016. Furthermore, controller mount 1018 in an embodiment includes a built in angular displacement sensor. In one embodiment, the built in angular displacement sensor is configured to adjust the optics included in the light fixture, such as light fixture 1008 or 1012, to provide a flood beam when steering wheel 1016 is turning and to focus the angle of light spread for these light fixtures when steering wheel 1016 is straightened. This is an example of how controller mount 1018 may be coupled with an angular displacement sensor and an acceleration sensor to pair their features and capabilities with the light fixtures, thus achieving better dynamic use of the light output from the light fixtures and the vehicle. In one or more embodiments, light fixture 1008 may be coupled to power source 1010 and light fixture 1012 may be coupled to power source 1014.

A third element of controller mount 1018 is a manual control setting. Accordingly, the user may have buttons or selectors as pictured as selectors 1002, 1004, and 1006 as buttons and arrows that are configured to allow the user to change the degree spread from focused spot light through a range of spreads to achieve a wide flood light. Manual control buttons may be in the form of any selector type device known to one of ordinary skill in the art, including buttons, arrows, knobs, dials, levers, as well as touch screen selectors in accordance with the kind that appear on control screens for smart phones and tablets.

Turning to FIG. 11, a block diagram for a wireless controller mount is provided. FIG. 11 may provide components useful to the controller mount as pictured in FIG. 10 and described above. Controller 1116 is a wireless controller mount intended to exemplify wireless controller mount 1018 as pictured in FIG. 10. Controller mount 1116 is envisioned to include manual control buttons 1122, an acceleration sensor 1120, and an angular displacement sensor 1118. Acceleration sensor 1120 is the acceleration sensor described in FIG. 10, configured with the ability to determine the speed of the vehicle in which the controller is mounted. Angular displacement sensor 1018 is configured to provide data regarding the tilt of steering wheel on which the controller is mounted. The tilt of the steering wheel may provide data for adjusting the angle of spread of light output from the light fixtures.

Wireless transmitter 1126 is envisioned to be included in controller 1116. Wireless transmitter 1126 transmits data from wireless controller 1116 to wireless receiver 1114 located in light fixture 1104 or light bar head as it is may be termed. A vehicle power source such as a car battery is included as vehicle power source 1102. Optic head 1112 operates in accordance with the methods described above in FIG. 1A-FIG. 4 to manipulate the optics existing in light fixture 1104 to change the angle of light spread and light output. In one or more embodiments, light bar fixture 1104 may further include a power regulator, such as power regulator 1106, a motor driver, such as motor driver 1108, an LED/LED driver, such as LED/LED driver 1110 as known to those of ordinary skill in the art. Further, in one or more embodiments, wireless controller 1116 may include a power regulator, such as power regulator 1124 and a microcontroller, such as microcontroller 1128. In one or more embodiments, power regulator 1124 may be coupled to battery power source 1130. Thus a variety of control options have been discussed for both manually and automatically adjusting the light output and angle of spread of the light fixture to change from a focused spot light to a wide flood light. This is merely exemplary and not intended to be an exhaustive list or limitations on the methods or processes for controlling any light fixtures coupled to a vehicle.

Figure 12:
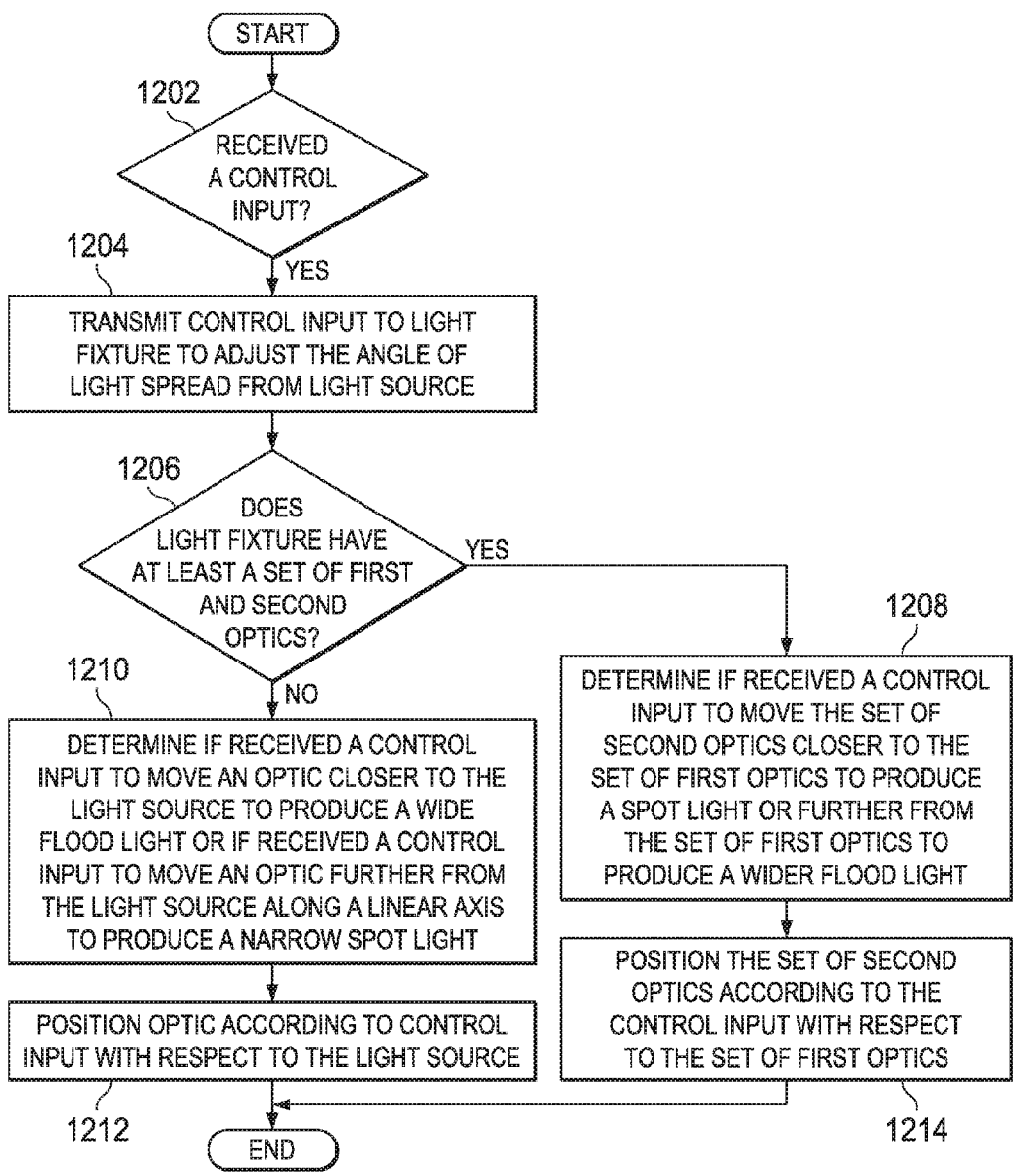
FIG. 12 is a flowchart illustrating a process for varying an angle of spread of a light source in a light fixture coupled to a surface of a vehicle in accordance with an illustrative embodiment.

Regarding FIG. 12, FIG. 12 is a flowchart illustrating a process for varying an angle of spread of a light source in a light fixture coupled to a surface of a vehicle in accordance with an illustrative embodiment. The process in FIG. 12 may be performed by a system for adjusting a position of a set of optics with respect to a set of second optics proximately located to a light source, such as the system discussed in FIG. 3. The process in FIG. 12 may also be performed by a system for adjusting a position of an optic proximately located to a light source, such as the system discussed in FIG. 4.

The process may begin by making a determination whether a control input was received (step 1202). If so, the process proceeds to transmit the control input to a mechanism configured for adjusting the apparatus for altering the angle of light spread from a light source, (step 1204). In a preferred embodiment, the light source may be a set of light emitting diodes (LED or LED's).

Next, in accordance with one embodiment, a determination is made whether the light fixture has at least a set of first and second optics (step 1206). Next in the process in FIG. 12, if there are a set of first and second optics, then a determination is made if the received control input indicates to move the set of second optics closer to the set of first optics to produce a spot light or further from the set of first optics to produce a wider flood light effect. (step 1208). FIG. 3 depicts a light fixture with components in accordance with this method and these embodiments. The set of second optics are thus positioned relative to the set of first optics according to the control input. (step 1214) As seen in FIGS. 6-11, various controllers are illustrated for receiving control inputs and commands. Control inputs may be manually entered by a user or automatically detected. The controller supplying the control input may be a programmable wire as seen in FIGS. 6-7, or may be a manual control knob that a user adjusts as needed. The controller supplying the control input may also be supplied through a control box located adjacent to a user, who is able to indicate the level needed for the angle of light spread as seen in FIGS. 8-9. The control inputs may also be automatically determined utilizing sensors and preprogrammed responses for resulting angle of spread as seen in FIGS. 10-11. Various methods and systems have been discussed herein for supplying the control input to activate the set of second optics with respect to the first optic at a desired position.

If the light fixture does not include a set of second optics, then a determination is made whether the received control input indicates whether to move an optic closer to a light source to produce a wide flood light or whether the received control input indicates to move an optic further away from the light source along a linear axis to produce a narrow spot light. (step 1210). The process then proceeds to step 1212, whereby the optic is positioned according to a control input with respect to the light source. The process may terminate thereafter or be continuously repeated to suit the needs of the user.

As previously described, a spot light effect occurs when a set of light beams are emitted at a lower angle of spread, so as to be directed and focused in a narrow projection on a small area. A flood light beam effect, as previously described, occurs when a set of light beams are emitted at a higher angle of spread, so as to be more widely spread out and cover a wider, general area of illumination. In some systems, the overall dimensions and shape of the output of light may also be altered to produce an elliptical shape instead of a circular shape. The overall process may end or may continually be repeated until the power provided by a power source to the light fixture is turned off or completely diminished.

The detailed description of the illustrative embodiments above is described in sufficient detail to enable those skilled in the art to practice the invention. To avoid unnecessary detail, the description may have omitted certain information known to those skilled in the art.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. Any feature that is described in connection to any one embodiment may also be applicable to any other embodiment. It is also understood that other embodiments may be utilized and that logical structural, mechanical and electrical changes may be made without departing from the spirit or scope of the invention.

What is claimed:

1. A lighting fixture for vehicles, comprising:
  a light stick, wherein the light stick is an enclosed module comprising:
    a set of light emitting diodes, wherein the set of light emitting diodes are contained in the light stick, wherein the light stick is configured to be mounted to a surface of a vehicle, wherein the set of light emitting diodes produce an output of light;
    an optic located proximately to the each light emitting diode of the set of light emitting diodes; and
    an adjustability mechanism, wherein the adjustability mechanism is configured to move the optic in a linear direction both towards and away from the each light emitting diode, wherein the output of light is variable dependent on the position of the optic with respect to the each light emitting diode, wherein the light output is alterable in both angle of light spread and overall shape.

2. The lighting fixture of claim 1, wherein the optic is an internally reflecting optic coupled with a convex optic.

3. The lighting fixture of claim 1, wherein the optic includes a channel, wherein the each light emitting diode is fixedly located within a hollow space of the channel.

4. The lighting fixture of claim 3, wherein the hollow space of the channel is configured to provide a space for the optic to move linearly towards and away from the each light emitting diode.

5. The lighting fixture of claim 1, wherein the output of light is capable of ranging from a narrow light spread to a wide light spread depending on the position of the optic with respect to the light emitting diode.

6. The lighting fixture of claim 1, wherein a wide angle light spread is produced, when the optic is located further from the each light emitting diode along a linear axis, and wherein a narrow light spread is produced when the optic is located closer to the each light emitting diode along the linear axis.

7. The lighting fixture of claim 1, wherein a controller is coupled to the lighting fixture, wherein the controller is comprised of at least one programmable wire, wherein the programmable wire is applied to a power source to adjust the angle of spread to the particular angle of spread that is satisfactory to a user.

8. The lighting fixture of claim 1, wherein the lighting fixture is coupled to a manual control selector, wherein the manual control selector provides a user with an ability to make the selection for the particular angle of spread by manipulating the manual control selector to manually select the particular angle of spread on the lighting fixture, wherein the lighting fixture is coupled to a power source.

9. The lighting fixture of claim 1, wherein the controller is located within the interior of the vehicle in proximity to a user, wherein the controller includes a selector device for adjusting the angle of light spread of the output of light from the lighting fixture, wherein the controller includes an interface display that displays the range of degrees available for selecting a particular angle of light spread by using the selector device.

10. The lighting fixture of claim 1, wherein the controller for the light fixture is mounted to a surface of a steering wheel affixed to the vehicle, wherein the controller further comprises:
  an angular displacement sensor, wherein the angle of light is automatically adjusted to pre-designated settings for the angle of light to spread in conjunction with an act of turning the steering wheel;
  an acceleration sensor, wherein the angle of light is automatically adjusted in relation to a set of speeds as detected by the acceleration sensor;
  a set of manual control selectors, wherein the set of manual control selectors are located on the controller, and further wherein the set of manual control selectors allow the user to select the angle of spread directly on the controller as located on the steering wheel; and
  a wireless transmitter, wherein the wireless transmitter communicates data received from the controller to a wireless receiver located within the lighting fixture in order to change the angle of light spread for the output of light.

11. A method for varying an angle of light spread for a light fixture coupled to a surface of a vehicle, comprising:
  responsive to receiving a control input, transmitting the control input in order to manipulate a position of an optic with respect to a light source, wherein the optic is moveable along a linear axis both towards and away from the light source, and wherein both the light source and the optic are encapsulated in the light fixture; and
  activating a mechanism for positioning the optic with respect to the light source to achieve a desired angle of light spread, wherein the desired angle of light spread for the light fixture is variable by changing the position of the optic with respect to the light source, wherein the light output is alterable in both angle of light spread and overall shape.

12. A lighting fixture for vehicles, comprising:
  a light stick, wherein the light stick is an enclosed module, comprising:
    a set of light emitting diodes, wherein the set of light emitting diodes are contained in the light stick, wherein the set of light emitting diodes produce an output of light;
    a first optic encapsulating each light emitting diode;
    a second optic separate from the first optic and located parallel to and facing the first optic along a horizontal axis; and
    an adjustability mechanism, wherein the adjustability mechanism is configured to manipulate a position of the second optic linearly with respect to the first optic, wherein the output of light provided by the set of light emitting diodes is capable of adjustment over a range of angles of light spread depending on the position of the second optic respective to the first optic, wherein the second optic is moveable towards and away from the first optic, wherein the light output is alterable in both angle of light spread and overall shape.

13. The lighting fixture of claim 12, wherein the first optic comprises a TIR optic having a convex fluted surface.

14. The lighting fixture of claim 12, wherein the second optic comprises a plano lens coupled with a concaved fluted surface, wherein the concaved fluted surface of the second optic is facing towards the convex fluted surface of the first optic.

15. The lighting fixture of claim 12 wherein the second optic is a plano-concave lens and the first optic is a convex optic coupled to a TIR optic.

16. The method of claim 11, further comprising producing a spot light by moving the first optic towards the second optic over a range of distance between the first and the second optic the light source.

17. The method of claim 11 further comprising producing a flood light beam by moving the first optic away from the second optic over a range of distance between the first and the second optic the light source.

18. The lighting fixture of claim 12, wherein a controller is a selector attached to the light fixture configured for manual selection of a desired angle of light spread.

19. The lighting fixture of claim 12, wherein a controller is mounted to a steering wheel of the vehicle, wherein the controller is wirelessly connected to the light fixture, and wherein data transmitted to the light fixture engages the second optic to be moved in a direction with respect to the first optic in order to achieve the angle of light spread.

* * * * *